US012779655B2

(12) United States Patent
Hu et al.

(10) Patent No.: US 12,779,655 B2
(45) Date of Patent: Nov. 3, 2026

(54) POWER TOOL

(71) Applicant: Nanjing Chervon Industry Co., Ltd., Nanjing (CN)

(72) Inventors: Hengyong Hu, Nanjing (CN); Chengyu Zheng, Nanjing (CN); Shubin Tong, Nanjing (CN); Yukang Wu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 19/309,973

(22) Filed: Aug. 26, 2025

(65) Prior Publication Data

US 2026/0061584 A1 Mar. 5, 2026

(30) Foreign Application Priority Data

Aug. 29, 2024 (CN) ......................... 202411216321.5

(51) Int. Cl.
*B25F 5/00* (2006.01)
*B25F 5/02* (2006.01)

(52) U.S. Cl.
CPC ................ *B25F 5/001* (2013.01); *B25F 5/02* (2013.01)

(58) Field of Classification Search
CPC ........... B25F 5/001; B25F 1/04; B65D 16/006
See application file for complete search history.

(56) References Cited

U.S. PATENT DOCUMENTS 6,338,404 B1 1/2002 Chen
6,789,630 B2 * 9/2004 Quirijnen ................ B25F 5/001 173/114
7,306,048 B2 * 12/2007 Yamazaki ............ B25D 16/006 173/48
7,900,713 B2 3/2011 Chen
9,421,681 B2 * 8/2016 Zhang ...................... B25F 5/029
11,529,726 B2 * 12/2022 Bantle ...................... B25F 5/001
2007/0084616 A1 * 4/2007 Lam .......................... B25F 5/02 173/217

OTHER PUBLICATIONS

Extended Search Report from European application No. 25197992.8, dated Jan. 26, 2026.

* cited by examiner

*Primary Examiner* — Gloria R Weeks
(74) *Attorney, Agent, or Firm* — Greenberg Traurig, LLP

(57) ABSTRACT

A power tool includes a motor including a drive shaft; a clutch assembly; and a transmission assembly connecting the motor to the clutch assembly. The clutch assembly includes a first shaft locking assembly, a second shaft locking assembly, a transmission shaft, and a first output shaft, the first shaft locking assembly is sleeved on the transmission shaft and the first output shaft, and the second shaft locking assembly connects the transmission assembly to the first shaft locking assembly. When the drive shaft remains stationary and the first output shaft rotates along a first direction, the first shaft locking assembly prevents the transmission shaft from rotating. When the drive shaft remains stationary and the first output shaft rotates along a second direction, the first shaft locking assembly drives the transmission shaft to rotate, and the second shaft locking assembly prevents the transmission shaft and the first output shaft from rotating.

20 Claims, 17 Drawing Sheets

POWER TOOL

RELATED APPLICATION INFORMATION

This application claims the benefit under 35 U.S.C. § 119(a) of Chinese Patent Application No. 202411216321.5, filed on Aug. 29, 2024, which application is incorporated herein by reference in its entirety.

TECHNICAL FIELD

The present application relates to the technical field of tools and, in particular, to a power tool.

BACKGROUND

A power tool such as an electric wrench is used for applying torque to a fastener to tighten or loosen the fastener. The electric wrench uses a motor to tighten or loosen the fastener. When the power of the electric wrench is too low to drive the motor, the user needs to swing the grip to complete the transfer of rotational torque.

If the fastener needs to be tightened, the swinging of the grip by the user includes both the forward stroke for tightening the fastener and the return stroke in a direction opposite to that of tightening the fastener. Similarly, if the fastener needs to be loosened, the swinging of the grip includes both the forward stroke for loosening the fastener and the return stroke in a direction opposite to that of loosening the fastener. However, during the return stroke, the electric wrench drives the fastener to rotate.

This part provides background information related to the present application, and the background information is not necessarily the existing art.

SUMMARY

An object of the present application is to solve or at least alleviate part or all of the preceding problems. Therefore, an object of the present application is to provide a power tool so that a fastener does not rotate along with the power tool during the return stroke.

To achieve the preceding object, the present application adopts the technical solutions below.

A power tool includes a housing formed with or connected to a grip for holding; a motor including a drive shaft rotating about a first axis; a clutch assembly driven by the drive shaft; and a transmission assembly connecting the motor to the clutch assembly. The clutch assembly includes a first shaft locking assembly, a second shaft locking assembly, a transmission shaft, and an output shaft, the output shaft includes a first output shaft, the first shaft locking assembly is sleeved on the transmission shaft and the first output shaft and is used for transmitting the torque of the transmission shaft to the output shaft, and the second shaft locking assembly connects the transmission assembly to the first shaft locking assembly and is used for transmitting the torque of the transmission assembly to the first shaft locking assembly. When the drive shaft remains stationary and the first output shaft rotates along a first direction, the first shaft locking assembly prevents the transmission shaft from rotating, and the transmission shaft remains stationary. When the drive shaft remains stationary and the first output shaft rotates along a second direction, the first shaft locking assembly drives the transmission shaft to rotate along the second direction, and the second shaft locking assembly prevents the transmission shaft and the first output shaft from rotating. The second direction is opposite to the first direction.

In some examples, the output shaft further includes a second output shaft, the first output shaft rotates about the first axis, the second output shaft rotates about a second axis, and the first axis intersects with the second axis.

In some examples, the first shaft locking assembly includes a first shaft locking ring and a reversing wheel, where the first end of the first shaft locking ring is sleeved on the first output shaft, the second end of the first shaft locking ring mates with the reversing wheel, and the reversing wheel is sleeved on the transmission shaft.

In some examples, the first shaft locking assembly further includes a friction member and an abutment member, a side of the friction member is in contact with the reversing wheel, and the other side of the friction member is in contact with the abutment member.

In some examples, when the first output shaft rotates along the first direction, the first output shaft drives the first shaft locking ring to rotate, the friction member prevents the first shaft locking ring from driving the reversing wheel to rotate, and the reversing wheel remains stationary to prevent the transmission shaft from rotating.

In some examples, a protrusion is formed on a surface of the reversing wheel facing away from the first shaft locking ring, the first shaft locking assembly further includes a stopping assembly sleeved on the outer ring of the protrusion, and when the output shaft rotates along the first direction, the stopping assembly prevents the first shaft locking ring from driving the reversing wheel to rotate.

In some examples, the protrusion is a gear-like protrusion, the stopping assembly includes stop balls, a sleeve, elastic members, and a limiting ring, the sleeve includes holes, each stop ball passes through a respective hole and abuts against the protrusion, each elastic member passes through a respective hole and abuts against a respective stop ball, and the limiting ring is sleeved on the outer ring of the sleeve and abuts against the elastic members.

In some examples, the stopping assembly includes a stop ring, the stop ring includes multiple stopping portions protruding inward of the ring, and the multiple stopping portions abut against the protrusion.

In some examples, the protrusion is a smooth annular protrusion, and the multiple stopping portions are made of flexible rubber materials.

In some examples, an accommodation space is formed at a portion where the first shaft locking ring is in contact with the reversing wheel, and the transmission shaft includes a portion located in the accommodation space.

In some examples, the first shaft locking assembly further includes multiple locking posts and multiple toggle blocks, the multiple toggle blocks are fixedly connected to the reversing wheel, the multiple locking posts and the multiple toggle blocks are disposed in the accommodation space and surround the transmission shaft, and the multiple locking posts are spaced apart from the multiple toggle blocks.

In some examples, when the first output shaft rotates along the first direction, the multiple locking posts rotate along the first direction, and the accommodation space where the multiple locking posts are located increases so that the multiple locking posts are not in contact with the transmission shaft.

In some examples, the second shaft locking assembly includes a second shaft locking ring fixedly disposed in the housing.

In some examples, when the drive shaft remains stationary and the first output shaft rotates along the second direction, the multiple locking posts rotate along the second direction, and the accommodation space where the multiple locking posts are located decreases so that the multiple locking posts are in contact with the transmission shaft and the first shaft locking ring, and the transmission shaft is driven to rotate along the second direction.

In some examples, when the transmission shaft rotates along the second direction, the second shaft locking assembly prevents the transmission shaft from continuously rotating.

In some examples, a power tool includes a housing formed with or connected to a grip for holding; a motor including a drive shaft rotating about a first axis; a clutch assembly driven by the drive shaft; and a transmission assembly connecting the motor to the clutch assembly. The clutch assembly includes a first shaft locking assembly, a second shaft locking assembly, a transmission shaft, and an output shaft, the output shaft includes a first output shaft, the second shaft locking assembly connects the transmission assembly to the first shaft locking assembly, and the first shaft locking assembly is sleeved on the transmission shaft and the first output shaft. When the drive shaft remains stationary and the first output shaft and the transmission shaft are in a separated state, the first output shaft rotates relative to the transmission shaft along a first direction. When the drive shaft remains stationary and the first output shaft and the transmission shaft are in an engaging state, the first output shaft and the transmission shaft rotate along a second direction synchronously, and the second shaft locking assembly prevents the transmission shaft and the first output shaft from rotating. The second direction is opposite to the first direction.

In some examples, a power tool includes a housing formed with or connected to a grip for holding; a motor including a drive shaft rotating about a first axis; a clutch mechanism driven by the drive shaft; and a transmission assembly connecting the motor to the clutch assembly. The clutch assembly includes a first shaft locking assembly, a second shaft locking assembly, a transmission shaft, and an output shaft, the second shaft locking assembly connects the transmission assembly to the first shaft locking assembly, and the first shaft locking assembly is sleeved on the transmission shaft and the output shaft. The output shaft includes a first output shaft and a second output shaft, the first shaft locking assembly is sleeved on the transmission shaft and the first output shaft and is used for transmitting the torque of the transmission shaft to the first output shaft, and the first output shaft transmits the torque to the second output shaft. When the drive shaft remains stationary and the output shaft and the transmission shaft are in a separated state, the first output shaft rotates relative to the second output shaft along a first direction.

In some examples, the first output shaft rotates about the first axis, the second output shaft rotates about a second axis, and the first axis intersects with the second axis.

In some examples, when the drive shaft remains stationary and the output shaft and the transmission shaft are in an engaging state, the first output shaft drives the second output shaft to rotate along the first direction.

In some examples, the second output shaft includes a clamping portion for clamping working attachments for implementing different functions.

In some examples, a power tool includes a housing formed with or connected to a grip for holding; a motor including a drive shaft rotating about a first axis; a power supply assembly for supplying power to the motor; a clutch assembly driven by the drive shaft; and a transmission assembly connecting the motor to the clutch assembly. The clutch assembly includes a first shaft locking assembly, a second shaft locking assembly, a transmission shaft, and an output shaft, the first shaft locking assembly is sleeved on the transmission shaft and the output shaft and is used for transmitting the torque of the transmission shaft to the output shaft, and the second shaft locking assembly connects the transmission assembly to the first shaft locking assembly and is used for transmitting the torque of the transmission assembly to the first shaft locking assembly. When the transmission assembly is driven by the drive shaft to rotate, the transmission assembly drives the second shaft locking assembly to rotate, the second shaft locking assembly drives the first shaft locking assembly to rotate, and the first shaft locking assembly drives the output shaft to rotate continuously.

In some examples, the output shaft includes a first output shaft and a second output shaft, the first output shaft rotates about the first axis, the second output shaft rotates about a second axis, and the first axis intersects with the second axis.

In some examples, the first shaft locking assembly includes a first shaft locking ring and a reversing wheel, where the first end of the first shaft locking ring is sleeved on the first output shaft, the second end of the first shaft locking ring mates with the reversing wheel, and the reversing wheel is sleeved on the transmission shaft.

In some examples, the first shaft locking assembly further includes multiple locking posts surrounding the transmission shaft and disposed between the transmission shaft and the first shaft locking ring.

In some examples, when the second shaft locking assembly drives the transmission shaft to rotate, the transmission shaft drives the first shaft locking ring to rotate through the multiple locking posts, the first shaft locking ring drives the first output shaft to rotate, and the first output shaft drives the second output shaft to rotate synchronously.

In some examples, multiple toggle blocks are formed on a side of the reversing wheel facing the first shaft locking ring, and the multiple toggle blocks surround the transmission shaft and are disposed between the transmission shaft and the first shaft locking ring.

In some examples, when the transmission shaft rotates, the transmission shaft drives the first shaft locking ring to rotate through the multiple locking posts and the multiple toggle blocks, the first shaft locking ring drives the first output shaft to rotate, and the first output shaft drives the second output shaft to rotate synchronously.

In some examples, the power tool further includes a controller for controlling the motor, and the controller is configured to control the drive shaft to stop continuously rotating when the battery level of the power supply assembly is lower than a preset threshold.

In some examples, the power tool further includes a forward rotation switch and a reverse rotation switch, and when the forward rotation switch or the reverse rotation switch is triggered, the controller controls the motor to drive the power tool to enter a manual working mode.

In some examples, when the power tool is in the manual working mode, the following is included: the transmission shaft remains stationary when the first output shaft rotates along a first direction; and the transmission shaft prevents the output shaft from continuously rotating when the first output shaft rotates along a second direction.

In some examples, a power tool includes a housing formed with or connected to a grip for holding; a motor including a drive shaft rotating about a first axis; a clutch assembly driven by the drive shaft; and a transmission assembly connecting the motor to the clutch assembly. The clutch assembly includes a first shaft locking assembly, a second shaft locking assembly, a transmission shaft, and an output shaft, the first shaft locking assembly is sleeved on the transmission shaft and the output shaft and is used for transmitting the torque of the transmission shaft to the output shaft, and the second shaft locking assembly connects the transmission assembly to the first shaft locking assembly and is used for transmitting the torque of the transmission assembly to the first shaft locking assembly. In a direction perpendicular to the first axis, the width of the power tool is less than or equal to 50 mm.

In some examples, the transmission assembly includes an inner ring gear in contact with the housing.

In some examples, the power tool includes a circuit board for controlling the operation of the power tool, and the circuit board is parallel to a vertical plane where the first axis is located.

In some examples, in a direction parallel to the first axis, the length of the power tool is less than or equal to 300 mm.

In some examples, the power tool includes an illumination assembly disposed on the head of the power tool, and the head is connected to the grip.

In some examples, the housing includes a grip housing and a head housing, and the grip may be fixedly mounted to the head housing.

In some examples, the housing includes a first housing and a second housing that are parallel to a plane where the first axis is located, and the first housing and the second housing are fixedly mounted.

In some examples, the power tool includes a switch assembly disposed on the grip, the switch assembly is connected to the circuit board, and the connecting wire between the switch assembly and the circuit board includes at least a portion intersecting with the first axis.

In some examples, the output shaft includes a first output shaft and a second output shaft, the first output shaft rotates about the first axis, the second output shaft rotates about a second axis, and the first axis intersects with the second axis.

In some examples, the second output shaft includes a clamping portion for clamping working attachments for implementing different functions.

In some examples, a power tool includes a housing formed with or connected to a grip for holding; a motor including a drive shaft rotating about a first axis; a clutch assembly driven by the drive shaft; a transmission assembly connecting the motor to the clutch assembly; and a power supply assembly for supplying power to the motor. The clutch assembly includes a first shaft locking assembly, a transmission shaft, and an output shaft, and the first shaft locking assembly is sleeved on the transmission shaft and the output shaft and is used for transmitting the torque of the transmission shaft to the output shaft. The power tool further includes a reversing member disposed on the grip and in contact with the first shaft locking assembly, and the reversing member is used for driving the power tool to work when the power supply assembly cannot drive the motor to rotate.

In some examples, the power tool further includes a switch assembly, and the switch assembly includes a forward rotation switch and a reverse rotation switch that are disposed on the upper side of the reversing member.

In some examples, the reversing member includes a first opening and a second opening. When the reversing member is at a first position, the first opening corresponds to the forward rotation switch, and the second opening corresponds to the reverse rotation switch.

In some examples, when the power supply assembly is fully charged, the forward rotation switch is pressed to be activated and penetrates the first opening, or the reverse rotation switch is pressed to be activated and penetrates the second opening.

In some examples, when the power supply assembly cannot drive the motor to rotate, the reversing member is pushed to a second position, and the reversing member prevents the forward rotation switch or the reverse rotation switch from being pressed and activated.

In some examples, the reversing member includes the first position and the second position. When the reversing member is pushed from the first position to the second position, through the first shaft locking assembly, the reversing member drives the power tool to work.

In some examples, the first shaft locking assembly includes a reversing wheel, the reversing member is in contact with the reversing wheel, and when the reversing member is pushed from the first position to the second position, the reversing member drives the reversing wheel to rotate.

In some examples, the first shaft locking assembly further includes a friction member and an abutment member, a side of the friction member is in contact with the reversing wheel, and the other side of the friction member is in contact with the abutment member.

In some examples, the switch assembly further includes a switch friction member disposed between the reversing member and the first shaft locking assembly.

In some examples, a forward rotation switch spring is disposed inside the forward rotation switch, and a reverse rotation switch spring is disposed inside the reverse rotation switch.

The benefit of the present application is described below. The first shaft locking assembly and the second shaft locking assembly are provided so that when the drive shaft remains stationary and the first output shaft rotates along the first direction, the first shaft locking assembly prevents the transmission shaft from rotating, and the transmission shaft remains stationary; and when the drive shaft remains stationary and the output shaft rotates along the second direction, the first shaft locking assembly drives the transmission shaft to rotate along the second direction, and the second shaft locking assembly prevents the transmission shaft and the first output shaft from rotating. Therefore, when the electric motor is not working, even if the first output shaft rotates, the first output shaft does not drive the transmission shaft to rotate, and the first output shaft can rotate relative to the entire power tool so that during the return stroke of the power tool, the rotation of the first output shaft cannot drive the transmission shaft to rotate, and thus the fastener does not rotate.

DETAILED DESCRIPTION

Figure 1:
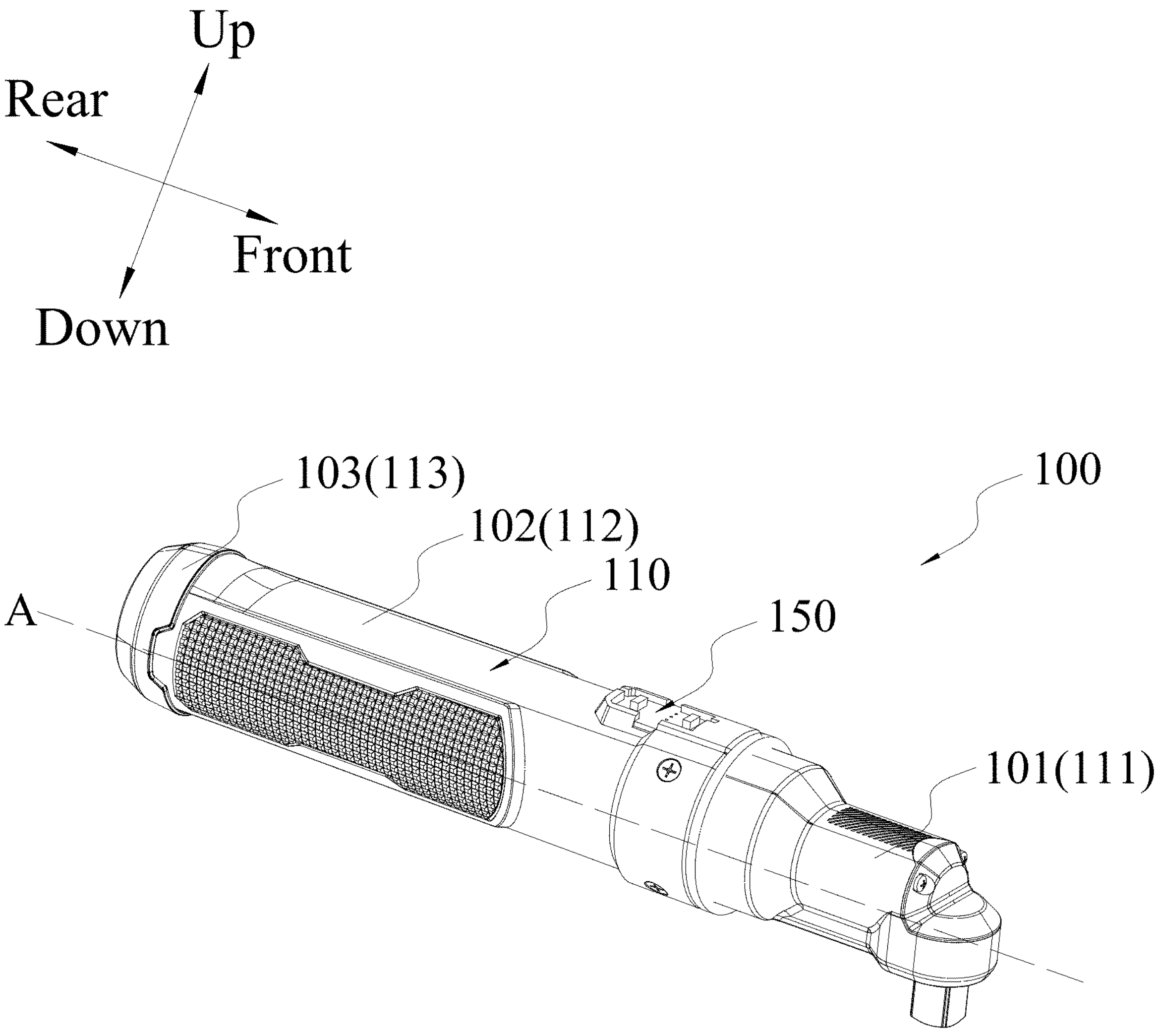
FIG. 1 is a perspective view of an electric wrench according to an example.

Before any examples of this application are explained in detail, it is to be understood that this application is not limited to its application to the structural details and the arrangement of components set forth in the following description or illustrated in the above drawings.

In this application, the terms “comprising”, “including”, “having” or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase “comprising a . . . ” does not preclude the presence of additional identical elements in the process, method, article, or device comprising that element.

In this application, the term “and/or” is a kind of association relationship describing the relationship between associated objects, which means that there can be three kinds of relationships. For example, A and/or B can indicate that A exists alone, A and B exist simultaneously, and B exists alone. In addition, the character “/” in this application generally indicates that the contextual associated objects belong to an “and/or” relationship.

In this application, the terms “connection”, “combination”, “coupling” and “installation” may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, “connection” and “coupling” are not limited to physical or mechanical connections or couplings, and may include electrical connections or couplings.

In this application, it is to be understood by those skilled in the art that a relative term (such as “about”, “approximately”, and “substantially”) used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance. In addition, “substantially” when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies, one member, or multiple members. Likewise, a function performed by a member may be performed by one member, an assembly, or a combination of members.

In this application, the terms “up”, “down”, “left”, “right”, “front”, and “rear” and other directional words are described based on the orientation or positional relationship shown in the drawings, and should not be understood as limitations to the examples of this application. In addition, in this context, it also needs to be understood that when it is mentioned that an element is connected “above” or “under” another element, it can not only be directly connected “above” or “under” the other element, but can also be indirectly connected “above” or “under” the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

In this application, the terms “controller”, “processor”, “central processor”, “CPU” and “MCU” are interchangeable. Where a unit “controller”, “processor”, “central processing”, “CPU”, or “MCU” is used to perform a specific function, the specific function may be implemented by a single aforementioned unit or a plurality of the aforementioned unit.

In this application, the term “device”, “module” or “unit” may be implemented in the form of hardware or software to achieve specific functions.

In this application, the terms “computing”, “judging”, “controlling”, “determining”, “recognizing” and the like refer to the operations and processes of a computer system or similar electronic computing device (e.g., controller, processor, etc.).

The power tools to which the technical solutions of the present application are applicable include handheld power tools, fastening power tools, and the like. For example, the power tools may be electric wrenches, screwdrivers, and the like. Any other types of power tools that can adopt the substantial content of the technical solutions disclosed below are within the scope of the present application.

The case where the power tool is an electric wrench is used as an example for a specific description in the present application. In the manual mode in which the wrench is used manually, the user needs to swing the grip of the wrench back and forth to tighten or loosen a fastener. The swing includes a forward stroke and a return stroke. The forward stroke is in the same direction as the user’s purpose. For example, if the fastener needs to be tightened, the forward stroke is in the tightening direction. The return stroke is opposite to the forward stroke and in the direction opposite to the user’s purpose. The case where the fastener is tightened is used as an example. When the wrench is used manually, the wrench can tighten the fastener during the forward stroke, but during the return stroke, if the wrench is still in contact with the fastener, the wrench drives the fastener to rotate backward, causing the fastener to rotate along with the wrench and loosen. Based on this, the present application proposes an electric wrench so that during the return stroke in the manual mode, the wrench is in contact with the fastener and the fastener does not rotate along with the wrench.

Figure 2:
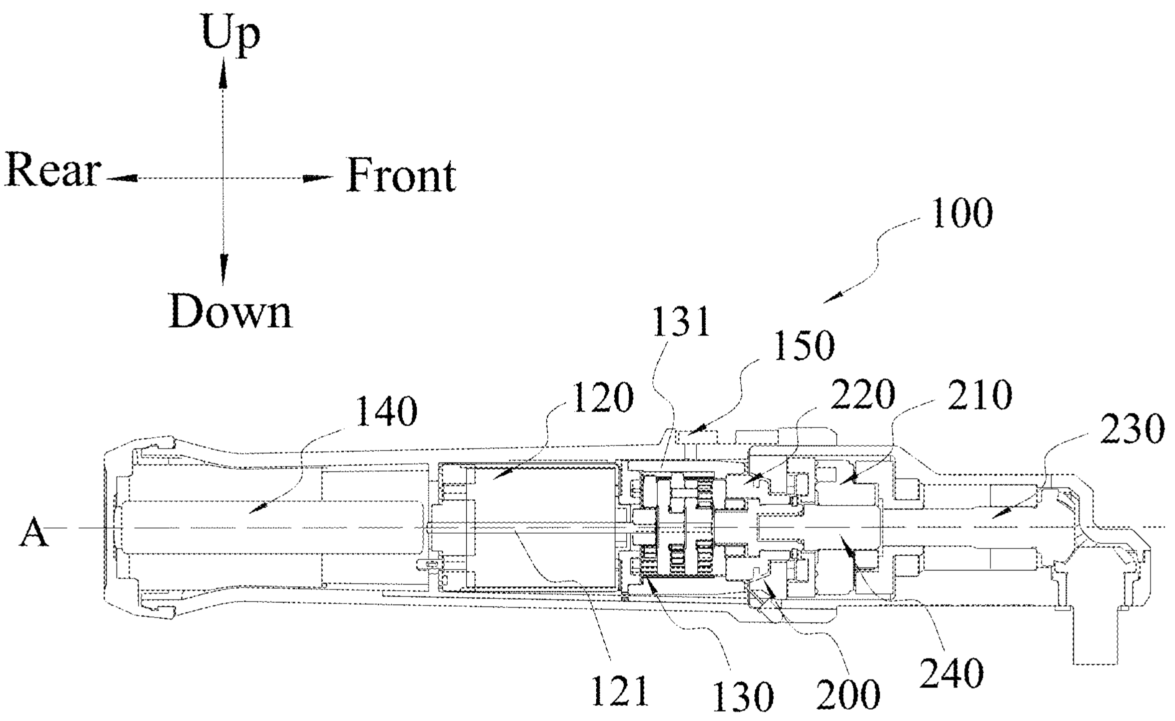
FIG. 2 is a side view illustrating the inside of the electric wrench in FIG. 1.

FIGS. 1 and 2 show an electric wrench 100 according to an example of the present application. To clearly illustrate the technical solutions of the present application, an upper side, a lower side, a front side, and a rear side as shown in FIGS. 1 and 2 are defined. As shown in FIGS. 1 and 2, the electric wrench 100 includes a housing 110, a motor 120, a transmission assembly 130, a power supply assembly 140, and a clutch assembly 200. The power supply assembly 140, the motor 120, the transmission assembly 130, and the clutch assembly 200 are arranged in the housing 110 of the electric wrench 100 from the rear to the front in sequence. The housing 110 extends basically parallel to a first axis A, and a grip is formed on or connected to the housing 110 and used for the user to hold. The motor 120 includes a drive shaft 121 that rotates about the first axis A. The power supply assembly 140 supplies power to the motor 120 to drive the drive shaft 121 to rotate.

In some examples, as shown in FIG. 1, the electric wrench 100 includes a head 101, a grip 102, and a tail 103 from the front to the rear, and the grip 102 connects the head 101 to the tail 103. The housing 110 includes a head housing 111, a grip housing 112, and a rear cover 113, and the rear cover 113 corresponds to the tail 103. The grip housing 112 is the main housing of the housing 110. The grip housing 112 is generally tubular. The motor 120 and the transmission assembly 130 are at least partially disposed in the grip housing 112. Optionally, the grip housing 112 and the rear cover 113 are separately provided, and the rear cover 113 is detachably mounted to the grip housing 112. Optionally, the grip housing 112 and the rear cover 113 are integrated, that is, in this case, the housing 110 includes only the head housing 111 and the grip housing 112.

The motor 120 includes the drive shaft 121 rotatable about a drive axis. In this example, the drive axis coincides with the first axis A. In other alternative examples, the drive axis and the first axis A are parallel to each other but do not coincide. In other alternative examples, the drive axis and the first axis A are arranged at a certain included angle. In this example, the motor 120 is specifically an electric motor, and the electric motor 120 is used instead of the motor in the subsequent description, which is not to limit the present invention. In this example, the electric motor 120 is a three-phase brushless motor including a rotor with a permanent magnet and three-phase stator windings U, V, and W that are commutated electronically. In some examples, the three-phase stator windings U, V, and W adopt a star connection. In some other examples, the three-phase stator windings U, V, and W adopt a delta connection. However, it is to be understood that other types of brushless electric motors are also within the scope of the present disclosure. The brushless electric motor may include fewer than or more than three phases.

The transmission assembly 130 is disposed between the clutch assembly 200 and the electric motor 120, connects the electric motor 120 to the clutch assembly 200, and is used for transmitting the torque of the drive shaft 121 to the clutch assembly 200, and the clutch assembly 200 is driven by the drive shaft 121. The transmission assembly 130 includes a planetary transmission set for reduction, where the planetary transmission set converts an output rotational speed of the electric motor 120 at a certain gear ratio to achieve suitable torque. It is to be understood that this example is only a preferred solution of the present invention, and the transmission assembly 130 is not limited to a planetary gear reduction mechanism and may be another reduction mechanism, such as a bevel gear reduction mechanism. Optionally, the planetary gear train may have one or more stages. As shown in FIG. 2, the planetary gear train in this example has three stages. The working principles of planetary gear reduction and mechanical adjustment of the gear ratio and the reduction performed by the transmission assembly 130 have been fully disclosed to those skilled in the art. Therefore, a detailed description is omitted here for clarity of description.

In this example, the power supply assembly 140 is a direct current power supply, specifically a battery, and the battery mates with a corresponding power supply circuit to supply power to the electric wrench 100. It is to be understood by those skilled in the art that the direct current power supply is not limited to the battery and may be a built-in rechargeable battery or a standard battery. It is to be understood that the electric wrench 100 may also supply power to corresponding components in the machine through mains power or an alternating current power supply in conjunction with the corresponding rectifier circuit, filter circuit, and voltage regulator circuit. In the subsequent description, the battery 140 is used instead of the power supply assembly 140, but it does not serve as a limitation to the present invention.

The electric wrench 100 further includes a switch assembly 150 mounted on the grip housing 112. When holding the grip, the user can trigger the switch assembly 150 relatively conveniently. The switch assembly 150 may be configured to be a main switch for activating and controlling the electric wrench 100.

As shown in FIG. 2, the clutch assembly 200 includes a first shaft locking assembly 210, a second shaft locking assembly 220, an output shaft 230, and a transmission shaft 240. The output shaft 230 includes a first output shaft 231 and a second output shaft 232. The first shaft locking assembly 210 is sleeved on the first output shaft 231 and the transmission shaft 240 to transmit the torque of the transmission shaft 240 to the output shaft 230. The second shaft locking assembly 220 connects the transmission assembly 130 to the first shaft locking assembly 210 and is used for transmitting the torque of the transmission assembly 130 to the first shaft locking assembly 210.

Figure 3:
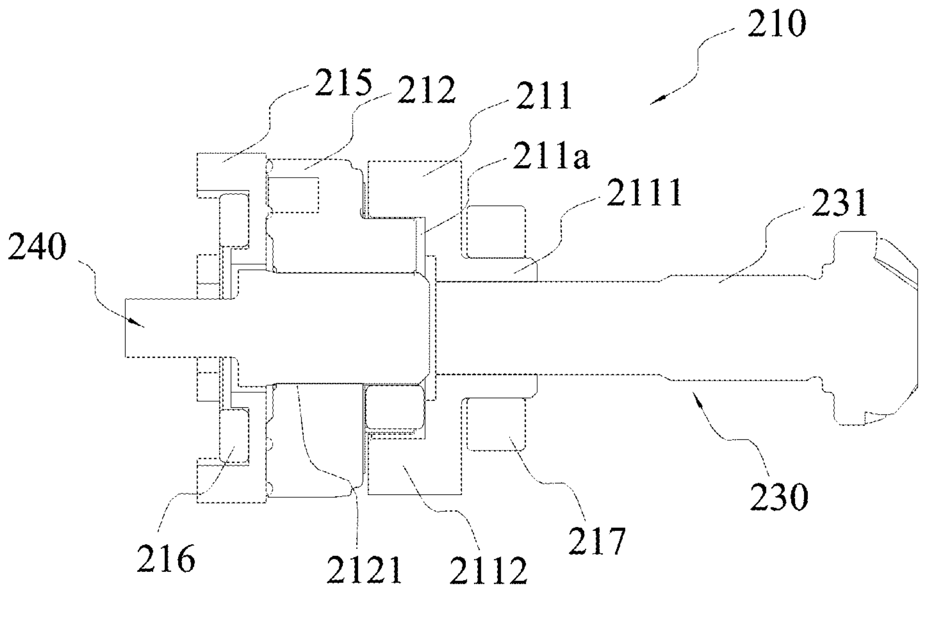
FIG. 3 is a side view of a first shaft locking assembly in FIG. 2.
Figure 4:
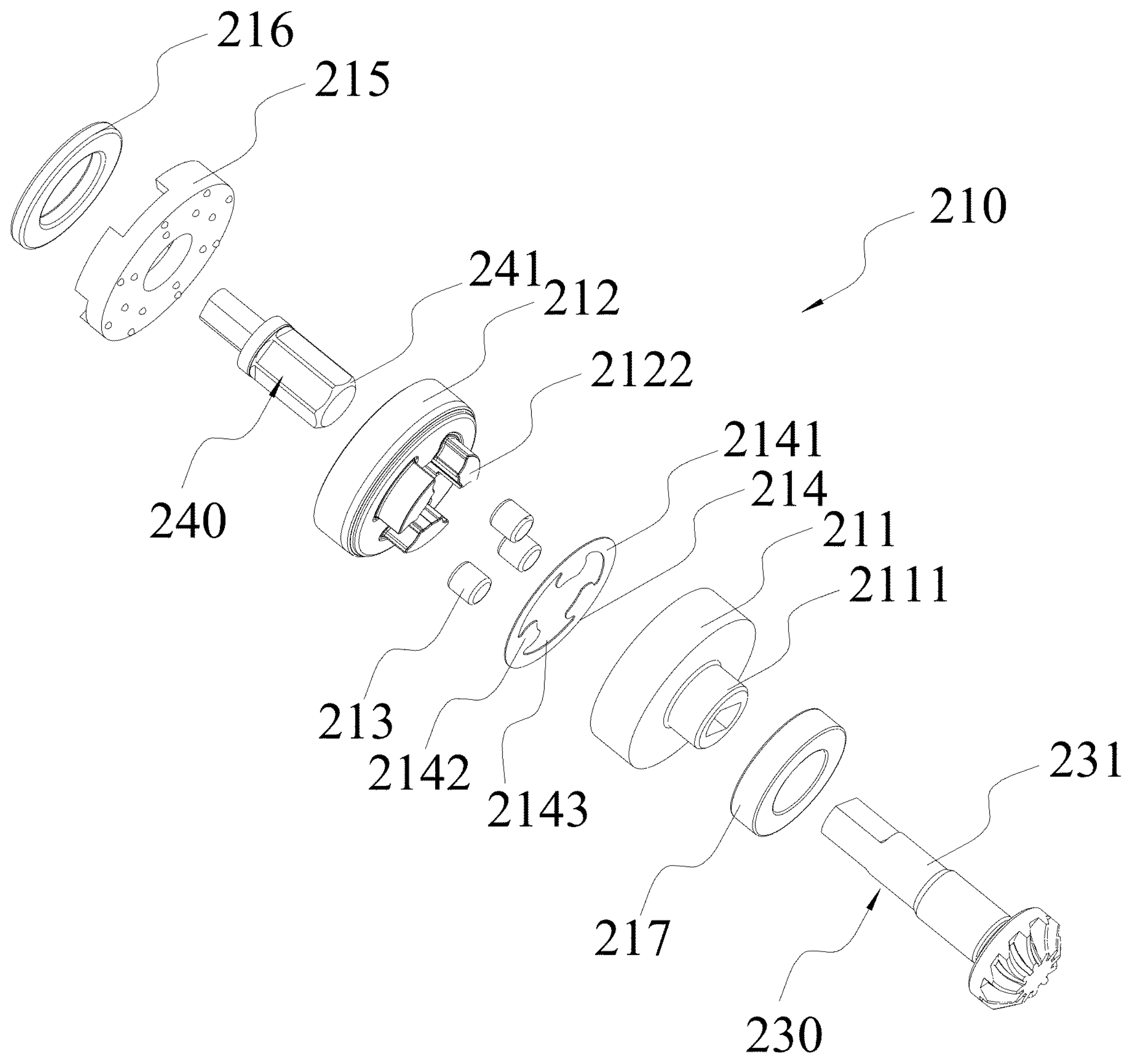
FIG. 4 is an exploded view of a first shaft locking assembly in FIG. 2.
Figure 5A:
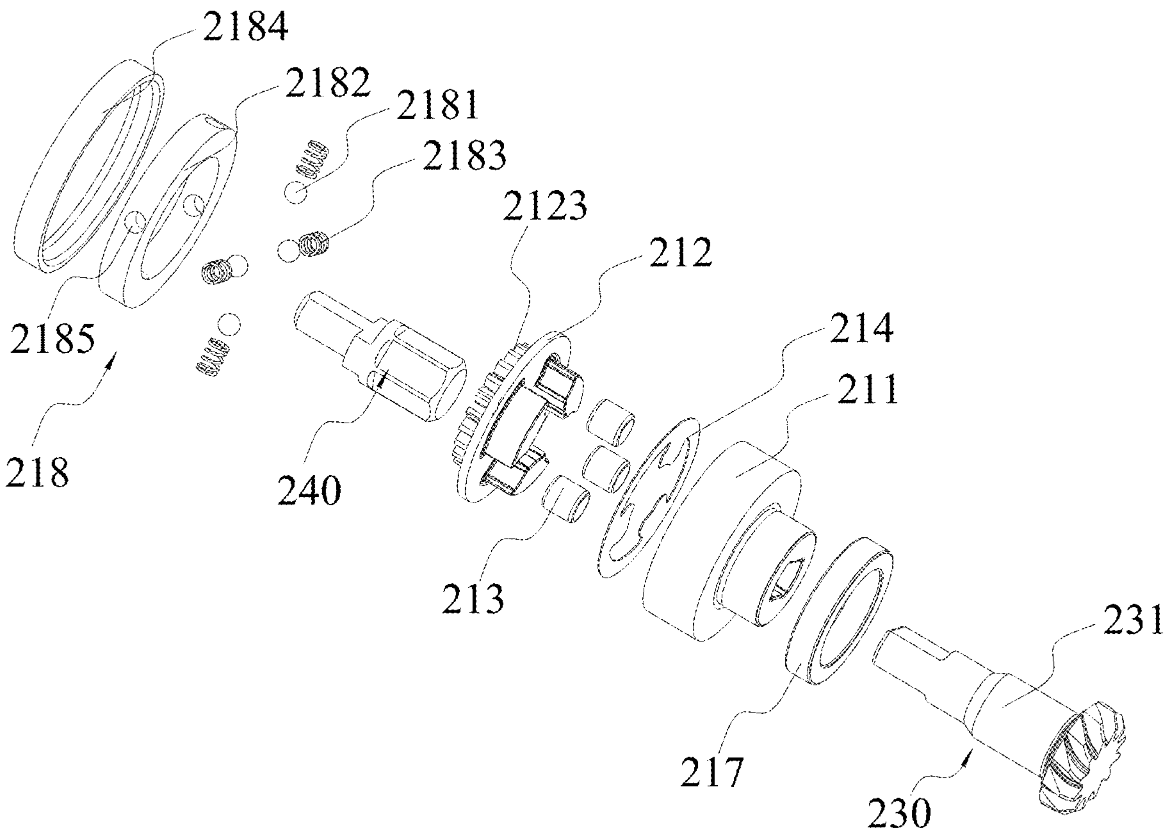
FIG. 5A is an exploded view illustrating that a reversing wheel forms a gear-like protrusion and a first shaft locking assembly includes a stopping assembly according to an example.
Figure 5B:
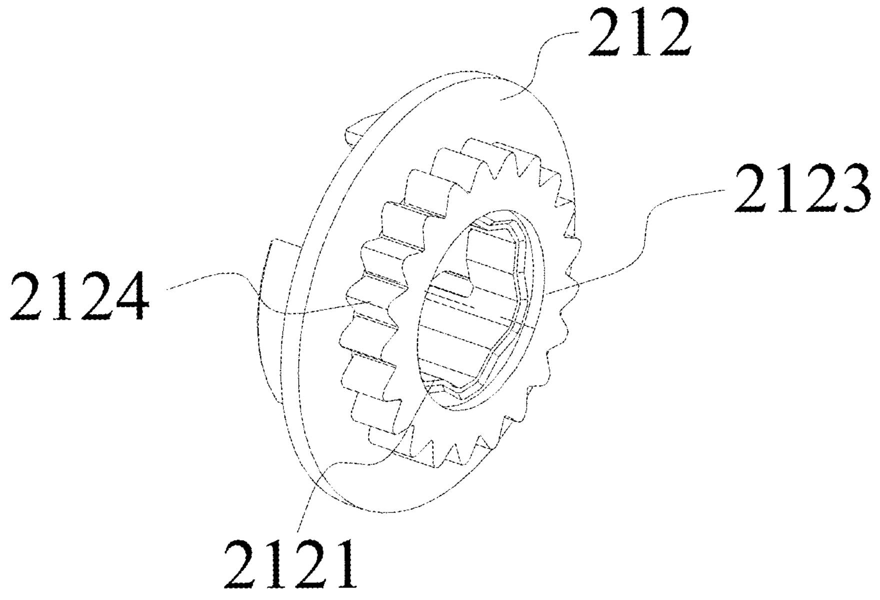
FIG. 5B is a perspective view of the reversing wheel in FIG. 5A.
Figure 5C:
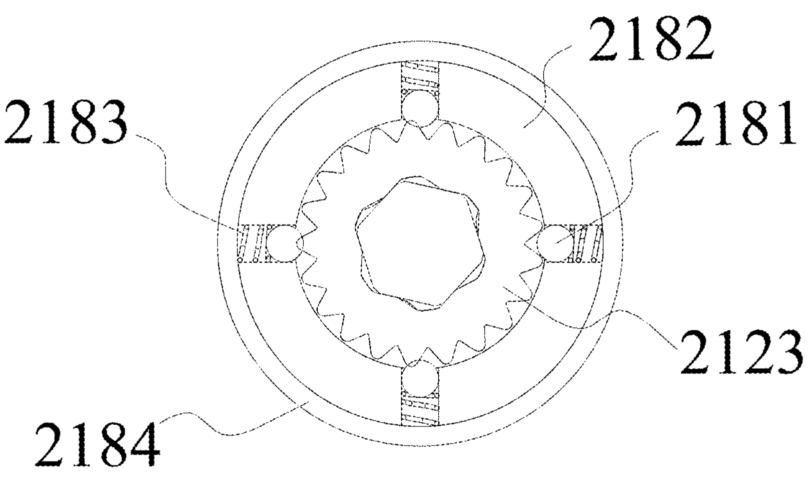
FIG. 5C is a schematic view illustrating that the stopping assembly mates with the reversing wheel in FIG. 5A.
Figure 5D:
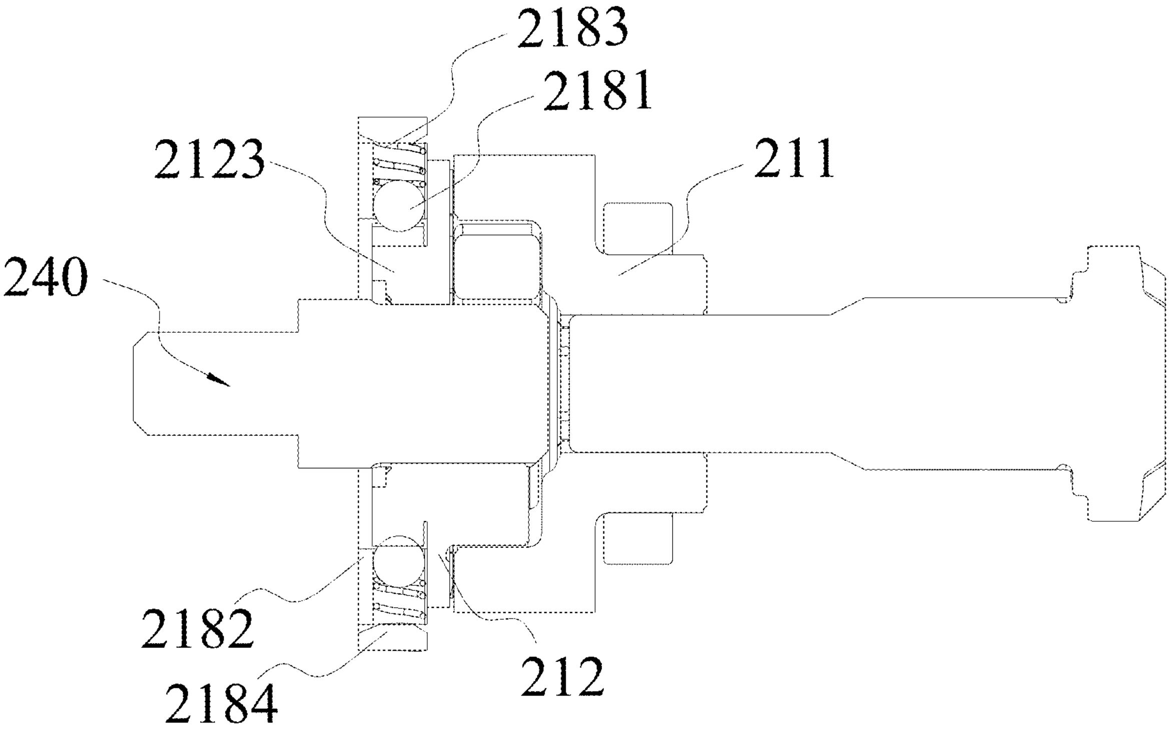
FIG. 5D is a side view of the first shaft locking assembly in FIG. 5A.

As shown in FIGS. 3 and 4, the first shaft locking assembly 210 includes a first shaft locking ring 211 and a reversing wheel 212. A first end 2111 of the first shaft locking ring 211 is in contact with the first output shaft 231, and a second end 2112 of the first shaft locking ring 211 mates with the reversing wheel 212. The first end 2111 of the first shaft locking ring 211 includes a hole matching the first output shaft 231 for engaging with the first output shaft 231. The second end 2112 of the first shaft locking ring 211 is a hollow structure. The second end 2112 includes an outer ring matching the reversing wheel 212 that can be sleeved on the reversing wheel 212. The second end 2112 is rotatably sleeved on the reversing wheel 212 and forms an accommodation space 211*a*. The center of the reversing wheel 212 includes a hole 2121 matching the transmission shaft 240 so that the transmission shaft 240 can pass through the hole 2121 and be clamped in the hole 2121. The transmission shaft 240 is at least partially located in the accommodation space 211*a*. The transmission shaft 240 has a transmission portion 241 mating with the hole 2121, and the transmission portion 241 is specifically an external hexagonal portion. Therefore, the case where the first shaft locking assembly 210 is sleeved on the transmission shaft 240 and the first output shaft 231 is specifically that the first end 2111 of the first shaft locking ring 211 is sleeved on the first output shaft 231, and the reversing wheel 212 is sleeved on the transmission shaft 240.

As shown in FIG. 4, multiple toggle blocks 2122 arranged around the hole 2121 with a certain interval between any two of the multiple toggle blocks 2122 are disposed on a side of the reversing wheel 212 facing the first shaft locking ring 211, that is, the multiple toggle blocks 2122 surround the transmission shaft 240 and are disposed in the accommodation space 211*a* between the transmission shaft 240 and the first shaft locking ring 211. The toggle block 2122 includes an inner surface facing the transmission shaft 240 and an outer surface facing the first shaft locking ring 211. The outer surface of the toggle block 2122 matches the outer ring of the first shaft locking ring 211. The case where the first shaft locking ring 211 is sleeved on the reversing wheel 212 is specifically that the first shaft locking ring 211 is sleeved on the toggle blocks 2122. The first shaft locking ring 211 can rotate relative to the toggle blocks 2122, that is, the reversing wheel 212. Optionally, the toggle blocks 2122 and the reversing wheel 212 are integrally formed. Optionally, the toggle blocks 2122 and the reversing wheel 212 are provided separately, and the toggle blocks 2122 are fixed on the reversing wheel 212. Optionally, three toggle blocks 2122 may be provided as shown in FIG. 4. In addition, the number of toggle blocks 2122 may be another number, which is not limited in the present application.

As shown in FIG. 4, the first shaft locking assembly 210 further includes multiple locking posts 213 surrounding the transmission shaft 240 and disposed in the accommodation space 211*a* between the transmission shaft 240 and the first shaft locking ring 211. Each of the multiple locking posts 213 is disposed in the interval between any two of the multiple toggle blocks 2122, that is, the multiple locking posts 213 are spaced apart from the multiple toggle blocks 2122, and each of the multiple locking posts 213 may slide in the interval between any two of the multiple toggle blocks 2122. The number of the multiple locking posts 213 is the same as the number of the multiple toggle blocks 2122. In this example, three locking posts 213 and three toggle blocks 2122 are provided.

As shown in FIG. 4, the first shaft locking assembly 210 further includes a spacer 214 disposed between the reversing wheel 212 and the first shaft locking ring 211. The spacer 214 is used for separating the locking posts 213 from the reversing wheel 212, and the spacer 214 can separate the reversing wheel 212 from the first shaft locking ring 211. Since the reversing wheel 212 has a relatively low hardness, if the reversing wheel 212 and the first shaft locking ring 211 are in direct contact and no spacer 214 is provided, the friction due to a relative motion between the reversing wheel 212 and the first shaft locking ring 211 causes the abrasion of an end surface of the reversing wheel 212.

The spacer 214 includes a body portion 2141 and extension portions 2142, where the body portion 2141 is an annular gasket having a through hole in the middle thereof, the extension portions 2142 extend toward the through hole in the middle of the annular gasket, the number of extension portions 2142 is consistent with the number of locking posts 213, and the extension portions 2142 are capable of being in contact with the locking posts 213. A side of the spacer 214 is attached to the surface of the reversing wheel 212 with the toggle blocks 2122. Moreover, the other side of the spacer 214 opposite to this surface abuts against the locking posts 213. Specifically, the extension portions 2142 abut against the locking posts 213. Moreover, the extension portions 2142 are disposed between the toggle blocks 2122 so that the toggle blocks 2122 and the extension portions 2142 are arranged alternately. An opening 2143 is formed between adjacent extension portions 2142, and each toggle block 2122 is inserted into the opening 2143. The shape of the through hole matches the shape of the hole 2121 so that the transmission shaft 240 can pass through the through hole. Optionally, the surface of the spacer 214 is flat, and the spacer 214 is a gasket with a flat end surface so that the surface on which the locking posts 213 are clamped is flat, thereby improving the stability of the clutch assembly 200 during torque output.

In some examples, as shown in FIGS. 3 and 4, the first shaft locking assembly 210 further includes a friction member 215, an abutment member 216, and a bearing 217. The friction member 215 is disposed between the reversing wheel 212 and the abutment member 216. An end of the friction member 215 is in contact with the reversing wheel 212, and the other end of the friction member 215 is in contact with the abutment member 216. The abutment member 216 abuts against the friction member 215 so that the friction member 215 can be relatively stably disposed between the reversing wheel 212 and the abutment member 216. Optionally, the friction member 215 may be rubber. Optionally, the friction member 215 may be made of any material that can provide friction, which is not limited in the present application. Optionally, the abutment member 216 may be a magnet that abuts against the friction member 215 through magnetic interaction with the reversing wheel 212. Optionally, the abutment member 216 may be a spring that abuts against the friction member 215 and the reversing wheel 212 through elastic action. In addition, the abutment member 216 may be any component that can play an abutting role, which is not limited in the present application. The friction member 215 can not only stop the reversing wheel 212 from rotating in time when the electric wrench 100 stops operating, but also increase the stability of the reversing wheel 212. When the electric wrench 100 shakes, the reversing wheel 212 does not shake. The bearing 217 is disposed at the front end of the first shaft locking ring 211, is sleeved on the first end 2111, and is used for supporting the first output shaft 231.

In some examples, a protrusion 2123 is formed on a side of the reversing wheel 212 facing away from the first shaft locking ring 211. The first shaft locking assembly 210 further includes a stopping assembly 218 sleeved on the outer ring of the protrusion 2123. The stopping assembly 218 is used for making the reversing wheel 212 stop rotating in time when the electric wrench 100 stops operating. The protrusion 2123 is a ring, and the middle of the protrusion 2123 is provided with the hole 2121 that matches the transmission shaft 240.

Optionally, as shown in FIGS. 5A to 5D, the protrusion 2123 is specifically a gear-like protrusion, and multiple teeth 2124 are formed on the outer circumference of the ring. The stopping assembly 218 includes stop balls 2181, a sleeve 2182, elastic members 2183, and a limiting ring 2184. The sleeve 2182 is in contact with the protrusion 2123. The sleeve 2182 includes at least one hole 2185. The stop ball 2181 can pass through the hole 2185 and abut against the protrusion 2123. The elastic member 2183 also passes through the hole 2185 and abuts against the stop ball 2181. The limiting ring 2184 is sleeved on the outer ring of the sleeve 2182 and abuts against the elastic members 2183 to prevent the elastic members 2183 and the stop balls 2181 from falling out of the holes 2185. As shown in FIGS. 5A to 5D, the case where four holes 2185 are provided is used as an example for a specific description of the present application. In addition, the number of holes 2185 may also be two, three, five, or any other number greater than or equal to one. The number of stop balls 2181, the number of elastic members 2183, and the number of holes 2185 are the same, and one stop ball 2181 and one elastic member 2183 are provided in each hole 2185.

When the electric wrench 100 is operating, the reversing wheel 212 is driven to rotate. In this case, the teeth 2124 on the protrusion 2123 press the stop balls 2181 toward the outer ring during rotation, and the stop balls 2181 further press the elastic members 2183 toward the outer ring so that the reversing wheel 212 can rotate normally. When the electric wrench 100 stops operating, the reversing wheel 212 is in an inertial rotation state. In this case, the reversing wheel 212 does not have a sufficient rotational force to press the stop balls 2181 toward the outer ring. The elastic members 2183 press the stop balls 2181 toward the inner ring based on elastic potential energy so that each stop ball 2181 falls between corresponding adjacent teeth 2124. In this manner, the stop balls 2181 prevent the reversing wheel 212 from rotating, and the reversing wheel 212 stops rotating.

Optionally, as shown in FIGS. 6A to 6D, the protrusion 2123 is specifically a smooth annular protrusion, the stopping assembly 218 includes a stop ring 2186, the stop ring 2186 includes multiple stopping portions 2187 protruding inward of the ring, the stopping portions 2187 abut against the protrusion 2123, and the stopping portions 2187 have an interference fit with the protrusion 2123. The stopping portions 2187 are made of flexible rubber materials. For example, the stopping portions 2187 may be made of butadiene rubber, or the stopping portions 2187 may be made of natural rubber. Optionally, the stop ring 2186 and the stopping portions 2187 are made of the same material. Optionally, the stop ring 2186 and the stopping portions 2187 are made of different materials, which is not limited in the present application.

Figure 6A:
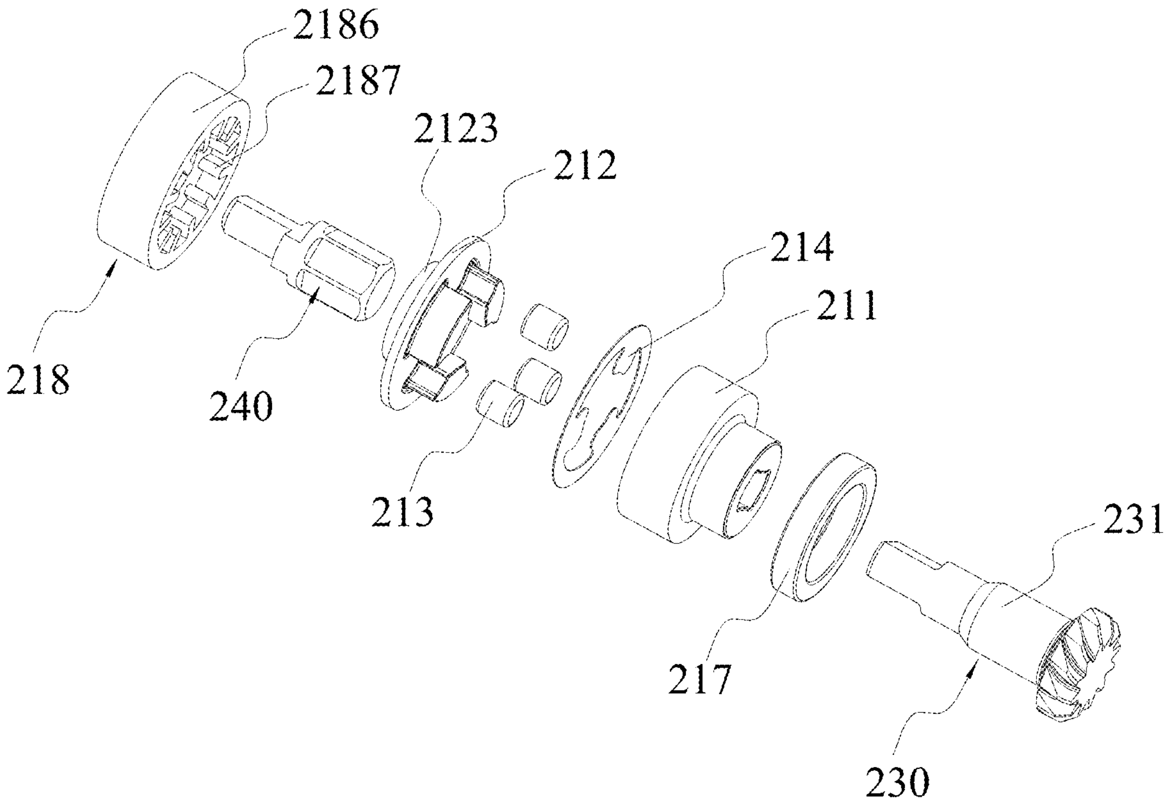
FIG. 6A is an exploded view illustrating that a reversing wheel forms a smooth annular protrusion and a first shaft locking assembly includes a stopping assembly according to an example.
Figure 6B:
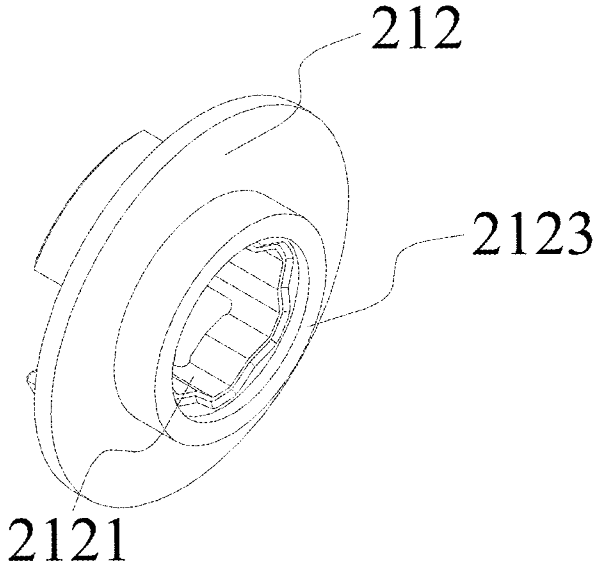
FIG. 6B is a perspective view of the reversing wheel in FIG. 6A.
Figure 6C:
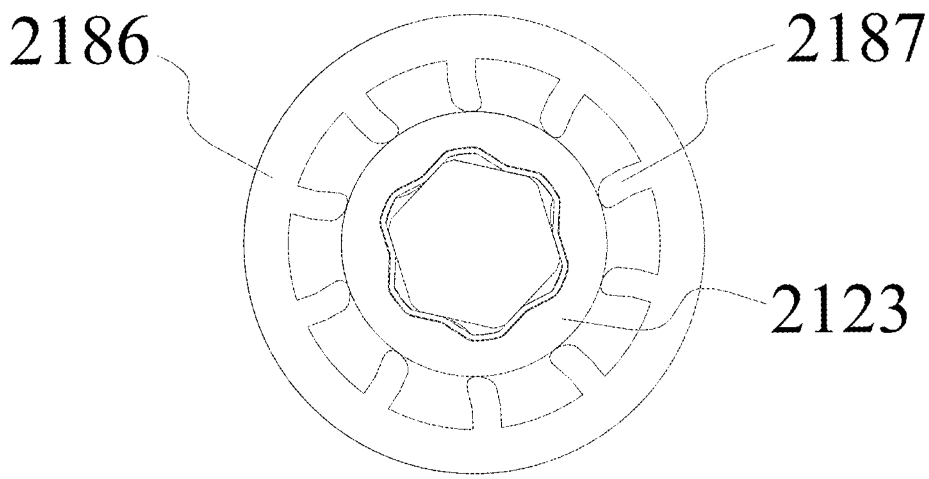
FIG. 6C is a schematic view illustrating that the stopping assembly mates with the reversing wheel in FIG. 6A.
Figure 6D:
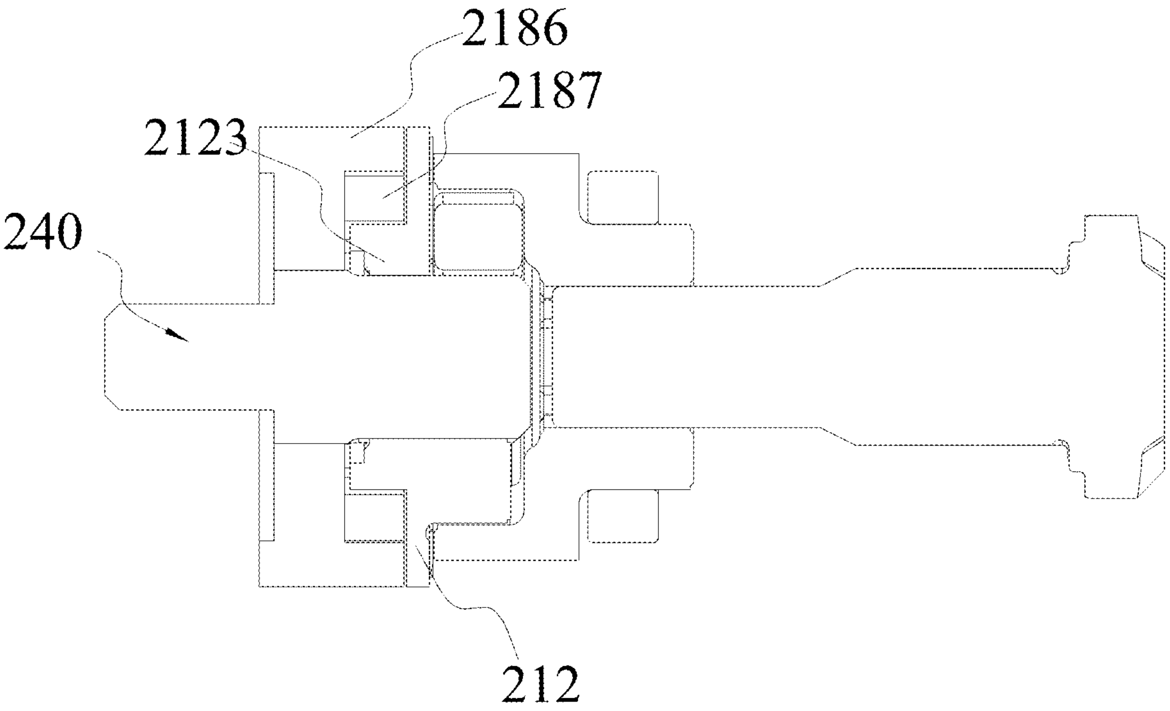
FIG. 6D is a side view of the first shaft locking assembly in FIG. 6A.

When the electric wrench 100 is operating, the reversing wheel 212 is driven to rotate. In this case, the reversing wheel 212 has a larger rotational force. As shown in FIG. 6C, the reversing wheel 212 may rotate relative to the stopping portions 2187, and the reversing wheel 212 presses the stopping portions 2187 toward a side along the circumference. When the electric wrench 100 stops operating, the reversing wheel 212 is in the inertial rotation state. In this case, the reversing wheel 212 does not have a sufficient rotational force to press the stopping portions 2187. The stopping portions 2187 need to be restored to the original state, applying a force in the opposite direction to the reversing wheel 212. The force offsets the inertial rotational force of the reversing wheel 212, causing the reversing wheel 212 to stop rotating. In the process of making the reversing wheel 212 stop rotating, the reversing wheel 212 generates a certain displacement based on the inertial rotational force before stopping. In this case, the opposite force generated by the stopping portions 2187 on the reversing wheel drives the reversing wheel to move in the opposite direction after the reversing wheel generates a certain displacement, that is, after the reversing wheel 212 generates a certain displacement, at least part of the displacement is offset. In this manner, the reversing wheel 212 can stop rotating without generating any displacement, thereby ensuring the stability of the stopping position of the reversing wheel 212.

Figure 7:
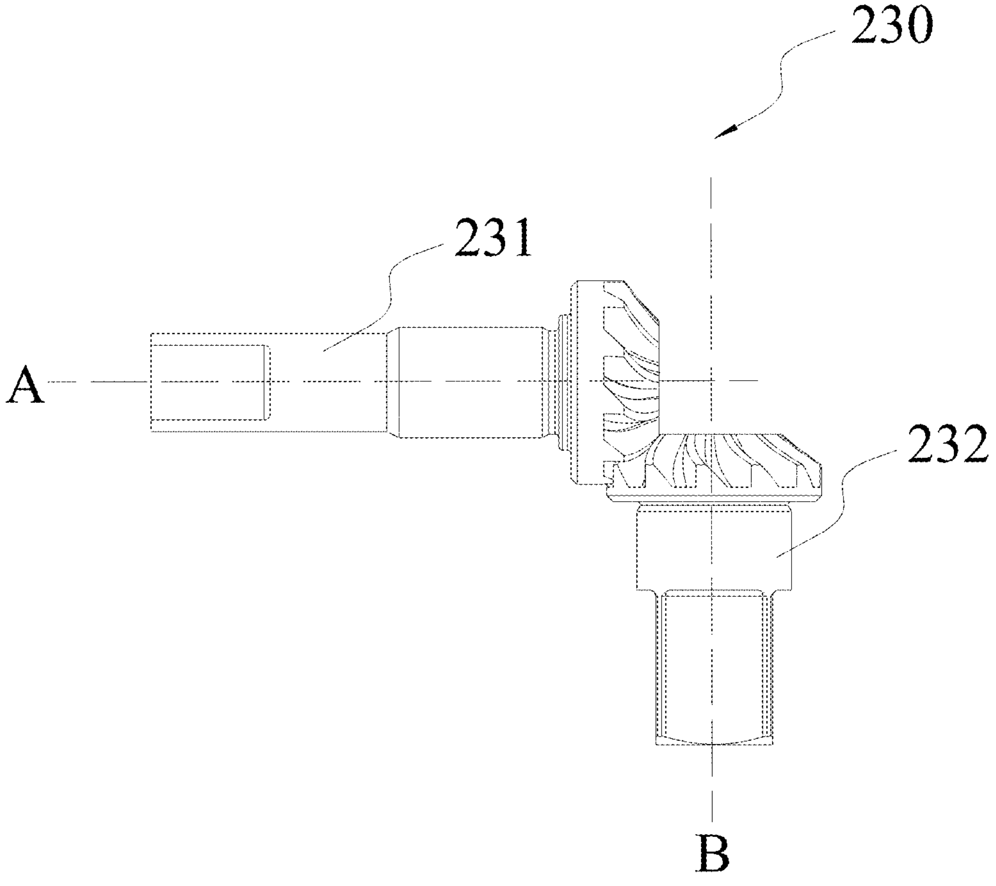
FIG. 7 is a side view of an output shaft in FIG. 1.

As shown in FIG. 7, the output shaft 230 includes the first output shaft 231 and the second output shaft 232. The first output shaft 231 is clamped in the hole of the first shaft locking ring 211, and a meshing transmission relationship exists between the first output shaft 231 and the second output shaft 232. The first output shaft 231 rotates about the first axis A, and the second output shaft 232 rotates about a second axis B. The first axis A intersects with the second axis B. Optionally, the included angle formed by the intersection of the first axis A and the second axis B may be an acute angle, which is the angle formed by the first output shaft 231 and the second output shaft 232. Optionally, the included angle formed by the intersection of the first axis A and the second axis B may be an obtuse angle, which is the angle formed by the first output shaft 231 and the second output shaft 232. Optionally, the included angle formed by the intersection of the first axis A and the second axis B may be a right angle as shown in FIG. 7, that is, the first output shaft 231 is perpendicular to the second output shaft 232.

Figure 8:
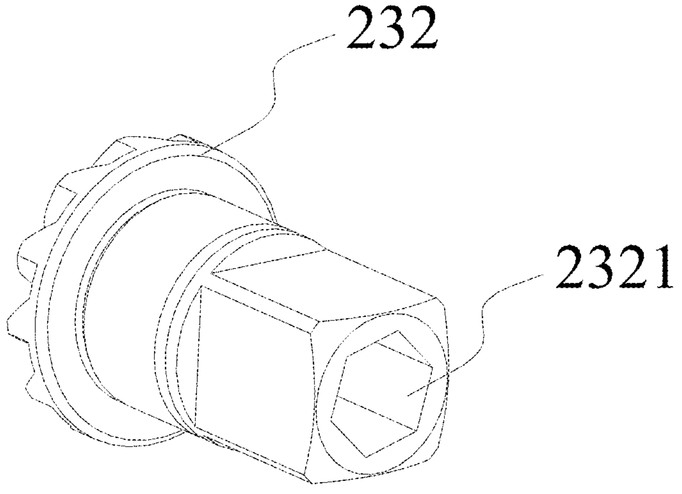
FIG. 8 is a perspective view of a second output shaft in FIG. 7.

In some examples, as shown in FIG. 8, the second output shaft 232 includes a clamping portion 2321, that is, the second output shaft 232 includes an opening. Optionally, different models of shafts may be replaced for the clamping portion 2321 of the second output shaft 232, such as a ⅜ square shaft, a ¼ square shaft, an internal hexagonal shaft, and other shafts, thereby achieving applications in different occasions. Optionally, the second output shaft 232 can clamp working attachments that implement different functions, such as a screwdriver, a drill bit, and a sleeve.

Figure 9:
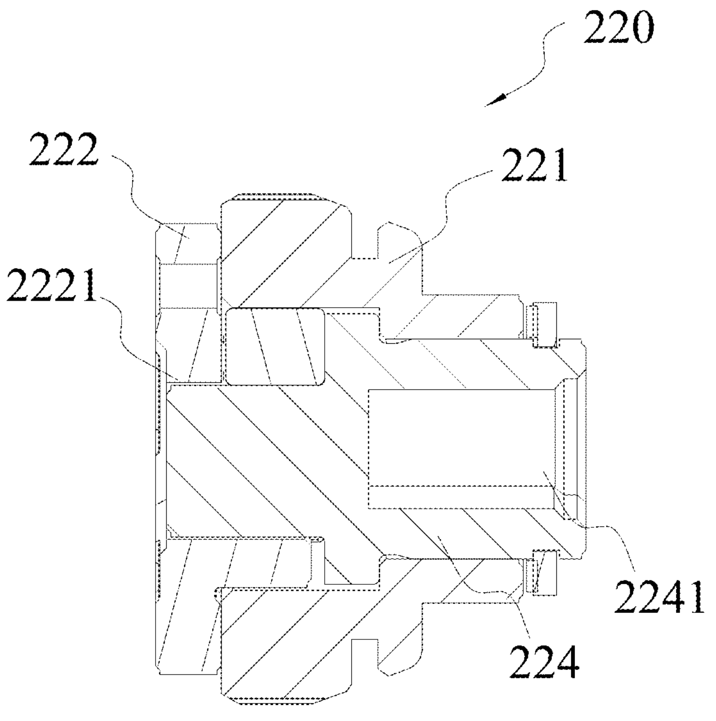
FIG. 9 is a sectional view of a second shaft locking assembly in FIG. 2.
Figure 10:
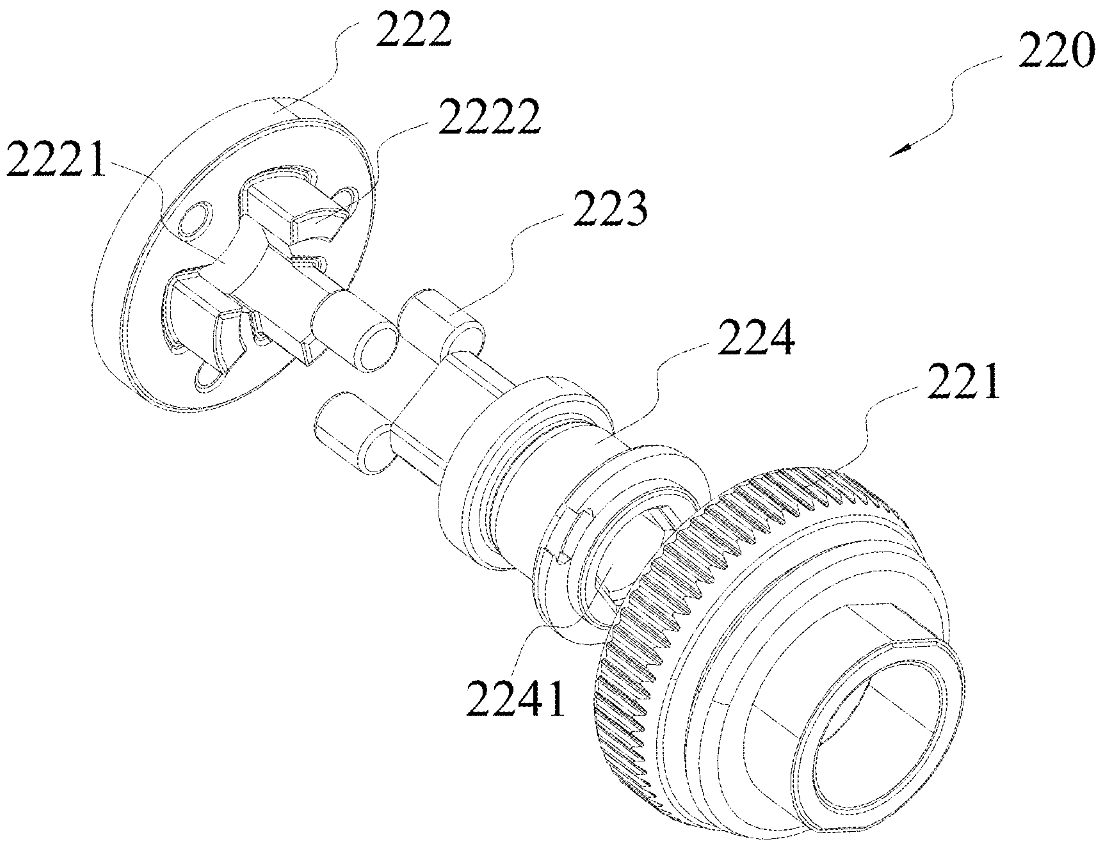
FIG. 10 is an exploded view of a second shaft locking assembly in FIG. 2.

As shown in FIGS. 9 and 10, the second shaft locking assembly 220 includes a second shaft locking ring 221, a drive wheel 222, and second locking posts 223. The clutch assembly 200 further includes a second transmission shaft 224. The drive wheel 222 includes a hole 2221 mating with the second transmission shaft 224. The drive wheel 222 is sleeved on the second transmission shaft 224 and rotates synchronously with the second transmission shaft 224. An end of the second transmission shaft 224 facing the first shaft locking assembly 210 includes an opening 2241, and the opening 2241 mates with the transmission shaft 240 to clamp the transmission shaft 240 so that the second transmission shaft 224 drives the transmission shaft 240 to rotate synchronously.

The second shaft locking ring 221 is fixedly disposed in the housing 110 and cannot rotate relative to the housing 110. The second shaft locking ring 221 is sleeved around the second transmission shaft 224, an accommodation space is formed between the second shaft locking ring 221 and the second transmission shaft 224, and the second locking posts 223 are located in the accommodation space. Multiple second toggle blocks 2222 arranged around the hole 2221 with a certain interval between any two of the multiple second toggle blocks 2222 are disposed on a side of the drive wheel 222 facing the second shaft locking ring 221, that is, the multiple second toggle blocks 2222 surround the second transmission shaft 224 and are disposed in the accommodation space between the second transmission shaft 224 and the second shaft locking ring 221. The mating relationship between the second toggle blocks 2222 and the second shaft locking ring 221 is the same as the mating relationship between the toggle blocks 2122 and the first shaft locking ring 211, the setting relationship of the second toggle blocks 2222 on the drive wheel 222 is the same as the setting relationship of the toggle blocks 2122 on the reversing wheel 212, the setting method and number of the second toggle blocks 2222 and the second locking posts 223 are the same as the setting method and number of the toggle blocks 2122 and the locking posts 213, and the details are not repeated here.

Optionally, the second shaft locking assembly 220 also includes a spacer disposed between the drive wheel 222 and the second shaft locking ring 221. The specific setting method and structure of this spacer are the same as those of the spacer 214, and the details are not repeated here.

In some examples, the electric wrench 100 includes a manual working mode. When the electric wrench 100 is in the manual working mode, the electric motor 120 does not rotate, that is, the drive shaft 121 of the electric motor 120 remains stationary so that the drive shaft 121 cannot drive the clutch assembly 200. In this case, the manual working mode specifically means that the user manually swings the electric wrench 100 back and forth to tighten or loosen the fastener.

When the user manually swings the electric wrench 100 for a manual return stroke, the first output shaft 231 rotates along a first direction, and the first shaft locking assembly 210 prevents the transmission shaft 240 from rotating so that the transmission shaft 240 remains stationary. That is, the first output shaft 231 and the transmission shaft 240 are in a separated (unlocked) state, and the first output shaft 231 rotates relative to the transmission shaft 240 along the first direction. Specifically, during a manual return stroke of the electric wrench 100, the user needs to swing the electric wrench 100 in a second direction, which is opposite to the first direction. That is, the first direction is the manual forward direction of the electric wrench 100, and the second direction is the manual return direction of the electric wrench 100.

Figure 11:
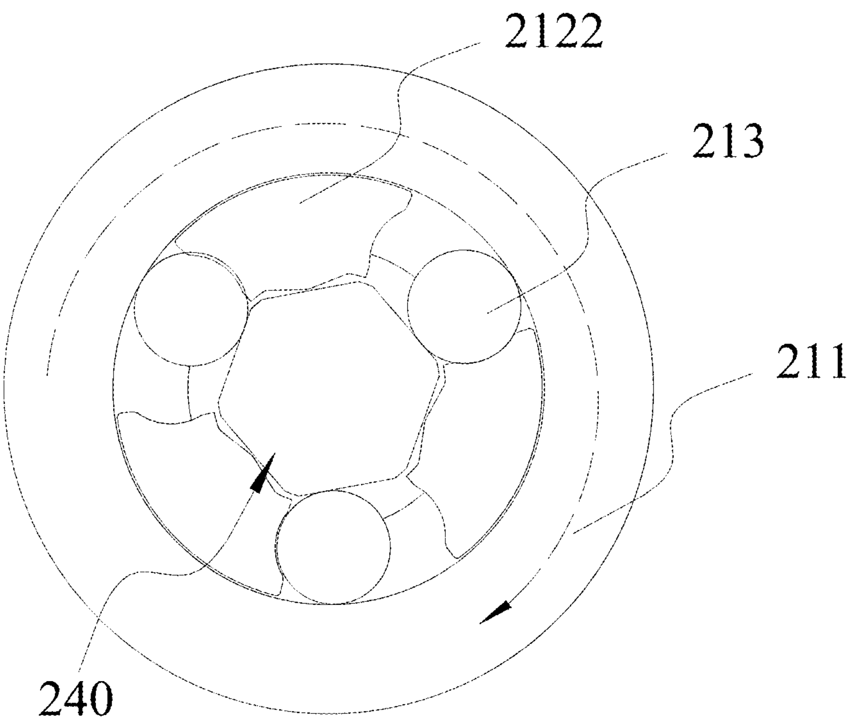
FIG. 11 is a rear view of a first shaft locking ring, locking posts, toggle blocks, and a transmission shaft during a manual return stroke according to an example.

As shown in FIG. 11, the case where the first direction is the clockwise direction and the second direction is the counterclockwise direction is used as an example for a specific description of the present application. In addition, the first direction may be the counterclockwise direction, and the second direction may be the clockwise direction. When the user swings the electric wrench 100 in the second direction, the first output shaft 231 rotates. Based on the rear view angle of the electric wrench 100, the first output shaft 231 rotates along the first direction, and the first output shaft 231 is clamped in the first shaft locking ring 211 to drive the first shaft locking ring 211 to rotate synchronously along the first direction. When the first shaft locking ring 211 rotates along the first direction, the first shaft locking ring 211 drives the multiple locking posts 213 inside the accommodation space to rotate along the first direction, and the accommodation space where the multiple locking posts 213 are located gradually increases until the multiple locking posts 213 are in contact with the multiple toggle blocks 2122. Moreover, the first shaft locking ring 211 tends to drive the reversing wheel 212 to rotate in the first direction, but the reversing wheel 212 is in contact with the friction member 215, and the friction between the friction member 215 and the reversing wheel 212 prevents the reversing wheel 212 from rotating so that the reversing wheel 212 remains stationary. Alternatively, the stopping assembly 218 prevents the first shaft locking ring 211 from driving the reversing wheel 212 to rotate so that the reversing wheel 212 remains stationary. Furthermore, the multiple toggle blocks 2122 on the reversing wheel 212 prevent the multiple locking posts 213 from being driven to rotate further, and the multiple toggle blocks 2122 that remain stationary cannot press the multiple locking posts 213 so that the multiple locking posts 213 are not in contact with the transmission shaft 240. Therefore, the first shaft locking ring 211 cannot transmit rotational torque to the transmission shaft 240 so that the transmission shaft 240 does not rotate. In this case, the first output shaft 231 and the transmission shaft 240 are in a separated (unlocked) state, the rotation of the first output shaft 231 is independent of the transmission shaft 240, and the first output shaft 231 rotates relative to the transmission shaft 240 along the first direction.

Therefore, during a manual return stroke of the electric wrench 100, when the user swings the electric wrench 100 in the second direction, the first output shaft 231 and the first shaft locking ring 211 rotate along the first direction, but the reversing wheel 212 prevents the transmission shaft 240 from rotating so that the first output shaft 231 and the first shaft locking ring 211 rotate along the first direction inside the electric wrench 100. Therefore, the first output shaft 231 rotates relative to the second output shaft 232 along the first direction, the first output shaft 231 cannot drive the second output shaft 232 to rotate, the second output shaft 232 remains stationary, and the second output shaft 232 does not drive the fastener to rotate so that the electric wrench 100 does not drive the fastener to rotate even during a return stroke of the electric wrench 100.

When the user manually swings the electric wrench 100 for a manual forward stroke, the first output shaft 231 rotates along the second direction, the first shaft locking assembly 210 drives the transmission shaft 240 to rotate along the second direction, and the second shaft locking assembly 220 prevents the transmission shaft 240 and the first output shaft 231 from rotating. That is, when the first output shaft 231 and the transmission shaft 240 are in an engaging (locked) state, the first output shaft 231 and the transmission shaft 240 rotate synchronously along the second direction, and the second shaft locking assembly 220 prevents the transmission shaft 240 and the first output shaft 231 from rotating. Specifically, during a manual forward stroke of the electric wrench 100, the user needs to swing the electric wrench 100 in the first direction, which is opposite to the second direction. That is, the first direction is the manual forward direction of the electric wrench 100, and the second direction is the manual return direction of the electric wrench 100.

Figure 12:
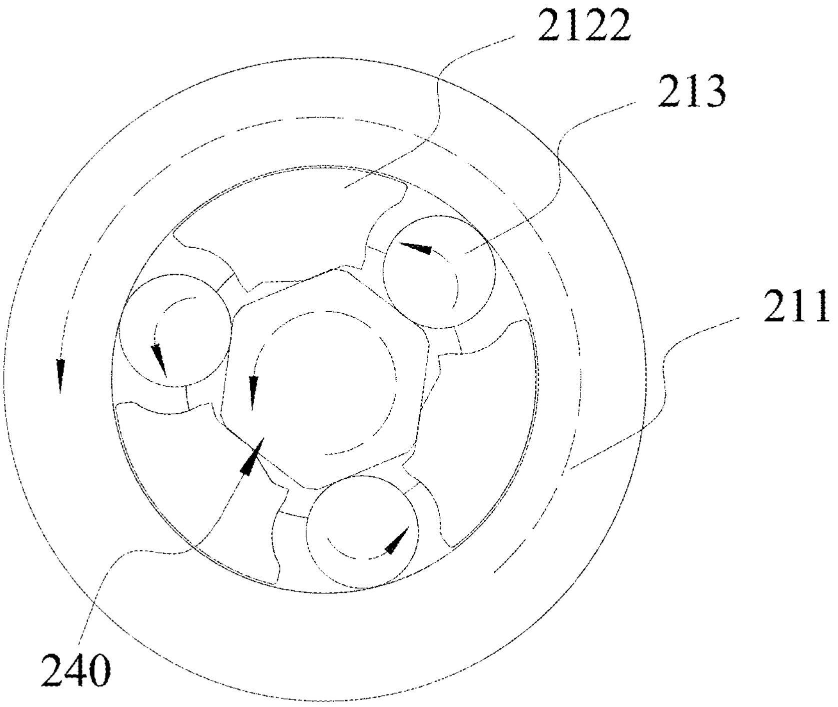
FIG. 12 is a rear view of a first shaft locking ring, locking posts, toggle blocks, and a transmission shaft during a manual forward stroke according to an example.

As shown in FIG. 12, the case where the first direction is the clockwise direction and the second direction is the counterclockwise direction is used as an example for a specific description of the present application. In addition, the first direction may be the counterclockwise direction, and the second direction may be the clockwise direction. When the user swings the electric wrench 100 in the first direction, the first output shaft 231 rotates. Based on the rear view angle of the electric wrench 100, the first output shaft 231 rotates along the second direction, and the first output shaft 231 is clamped in the first shaft locking ring 211 to drive the first shaft locking ring 211 to rotate synchronously along the second direction. When the first shaft locking ring 211 rotates along the second direction, the first shaft locking ring 211 drives the multiple locking posts 213 inside the accommodation space to rotate along the second direction, and the accommodation space where the multiple locking posts 213 are located gradually decreases so that the multiple locking posts 213 are in contact with the transmission shaft 240. In this case, the first shaft locking ring 211 tends to drive the reversing wheel 212 to rotate in the second direction, but the reversing wheel 212 is in contact with the friction member 215, and the friction between the friction member 215 and the reversing wheel 212 prevents the reversing wheel 212 from rotating so that the reversing wheel 212 remains stationary. Alternatively, the stopping assembly 218 prevents the reversing wheel 212 from rotating so that the reversing wheel 212 remains stationary. However, since the multiple locking posts 213 are in contact with the transmission shaft 240 and the multiple locking posts 213 are also in contact with the first shaft locking ring 211, the first shaft locking ring 211 can drive the transmission shaft 240 to rotate along the second direction through the multiple locking posts 213. In this case, the first output shaft 231 and the transmission shaft 240 are in an engaging (locked) state, and the rotation of the first output shaft 231 is related to the transmission shaft 240.

However, since the electric motor 120 does not rotate, the second transmission shaft 224 of the second shaft locking assembly 220 does not rotate so that the second transmission shaft 224 prevents the transmission shaft 240 from continuously rotating. That is, after the first output shaft 231 rotates to drive the transmission shaft 240 to tend to rotate, the second transmission shaft 224 prevents the transmission shaft 240 from rotating, and the transmission shaft 240 prevents the first output shaft 231 from rotating. In this case, the first output shaft 231, the first shaft locking ring 211, and the transmission shaft 240 may be regarded as a whole and do not rotate relative to the electric wrench 100.

Therefore, when the user swings the electric wrench 100 in the first direction, the first output shaft 231, the first shaft locking ring 211, and the transmission shaft 240 are regarded as a whole and remain stationary inside the electric wrench 100 so that the electric wrench 100 swings in the first direction. In this manner, the first output shaft 231 drives the second output shaft 232 to rotate along the first direction. That is, when the forward stroke is tightening, the second output shaft 232 can tighten the fastener, and when the forward stroke is loosening, the second output shaft 232 can loosen the fastener.

In addition, in the manual working mode, whether it is a manual return stroke or a manual forward stroke, when the user swings the electric wrench 100, the user can swing the electric wrench 100 at any angle to tighten or loosen the fastener. Compared with the existing electric wrench using a ratchet structure, which has the disadvantage of determining the swing angle based on the number of ratchet teeth, the present application can achieve stepless swing at any angle and can achieve a smaller swing angle so that work can be carried out even in a smaller space. Moreover, swinging at a smaller angle makes it labor-saving for the user to operate.

In some examples, the electric wrench 100 includes an electric working mode. When the electric wrench 100 is in the electric working mode, the electric motor 120 rotates, and the drive shaft 121 of the electric motor 121 rotates so that the drive shaft 121 can drive the clutch assembly 200. In this case, in the electric working mode, the user does not need to manually swing the electric wrench 100 back and forth to tighten or loosen the fastener.

When the electric wrench 100 is in the electric working mode, the transmission assembly 130 is driven by the drive shaft 121 to rotate so that the transmission assembly 130 drives the second shaft locking assembly 220 to rotate, the second shaft locking assembly 220 drives the first shaft locking assembly 210, and finally, the first shaft locking assembly 210 drives the output shaft 230 to rotate continuously. Specifically, the case where the first shaft locking assembly 210 drives the output shaft 230 to rotate continuously specifically refers to the following: when the drive shaft 121 rotates, the output shaft 230 rotates accordingly; unlike the reciprocating rotation in the existing art, the output shaft 230 rotates continuously along the rotational direction of the drive shaft 121 so that the output shaft 230 can efficiently tighten or loosen the fastener.

Figure 13:
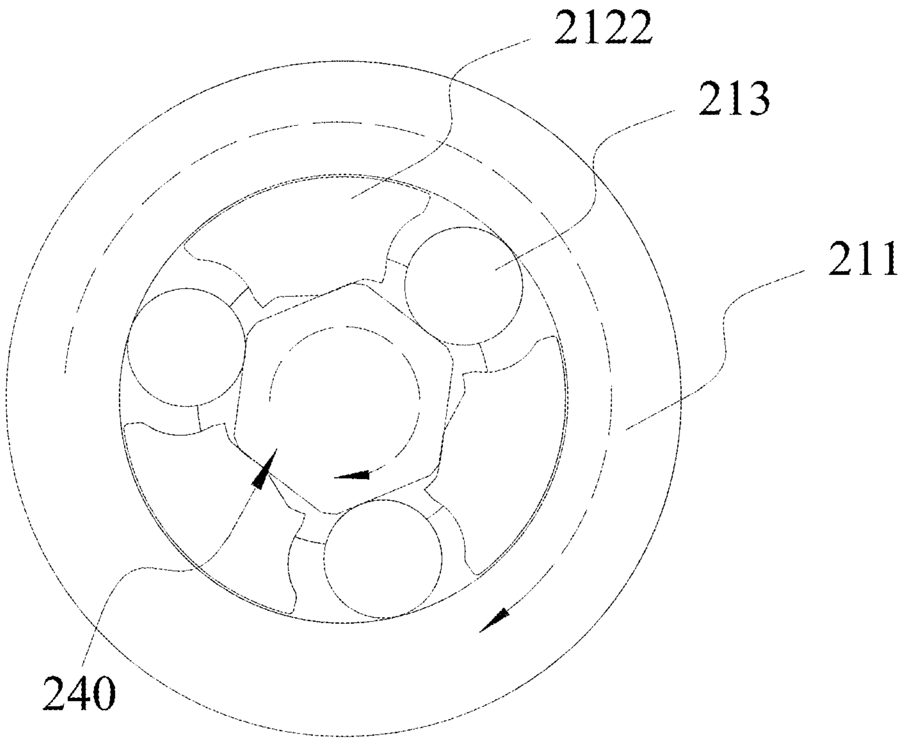
FIG. 13 is a rear view of a first shaft locking ring, locking posts, toggle blocks, and a transmission shaft in an electric working mode according to an example.

As shown in FIG. 13, the case where the transmission assembly 130 drives the second shaft locking assembly 220 to rotate is specifically as follows: the transmission assembly 130 rotates to drive the second transmission shaft 224 to rotate. In this manner, the second transmission shaft 224 drives the transmission shaft 240 mating with the second transmission shaft 224 to rotate synchronously. During the rotation of the transmission shaft 240, the transmission shaft 240 is in contact with the multiple locking posts 213 and presses the multiple locking posts 213 so that the multiple locking posts 213 are in contact with the first shaft locking ring 211. In this manner, through the multiple locking posts 213, the transmission shaft 240 drives the first shaft locking ring 211 to rotate synchronously. In addition, during the rotation of the transmission shaft 240, the transmission shaft 240 is in contact with the multiple toggle blocks 2122 to drive the multiple toggle blocks 2122 to rotate synchronously, that is, the transmission shaft 240 drives the reversing wheel 212 to rotate synchronously. In this manner, the transmission shaft 240 drives the first shaft locking ring 211 to rotate through the multiple locking posts 213 and the multiple toggle blocks 2122. Therefore, the first shaft locking ring 211 drives the output shaft 230 to rotate. Specifically, the first shaft locking ring 211 drives the first output shaft 231 to rotate, and the first output shaft 231 drives the second output shaft 232 to rotate synchronously.

Optionally, when the drive shaft 121 of the electric motor 120 rotates along the first direction, the second output shaft 232 also rotates along the first direction through the preceding transmission. Optionally, when the drive shaft 121 of the electric motor 120 rotates along the second direction, the second output shaft 232 also rotates along the second direction through the preceding transmission. In the electric working mode, whether the electric wrench 100 tightens or loosens the fastener depends on the rotational direction of the drive shaft 121 of the electric motor 120. The drive shaft 121 rotates so that the electric wrench 100 can be continuously operated to tighten or loosen the fastener.

Figure 14:
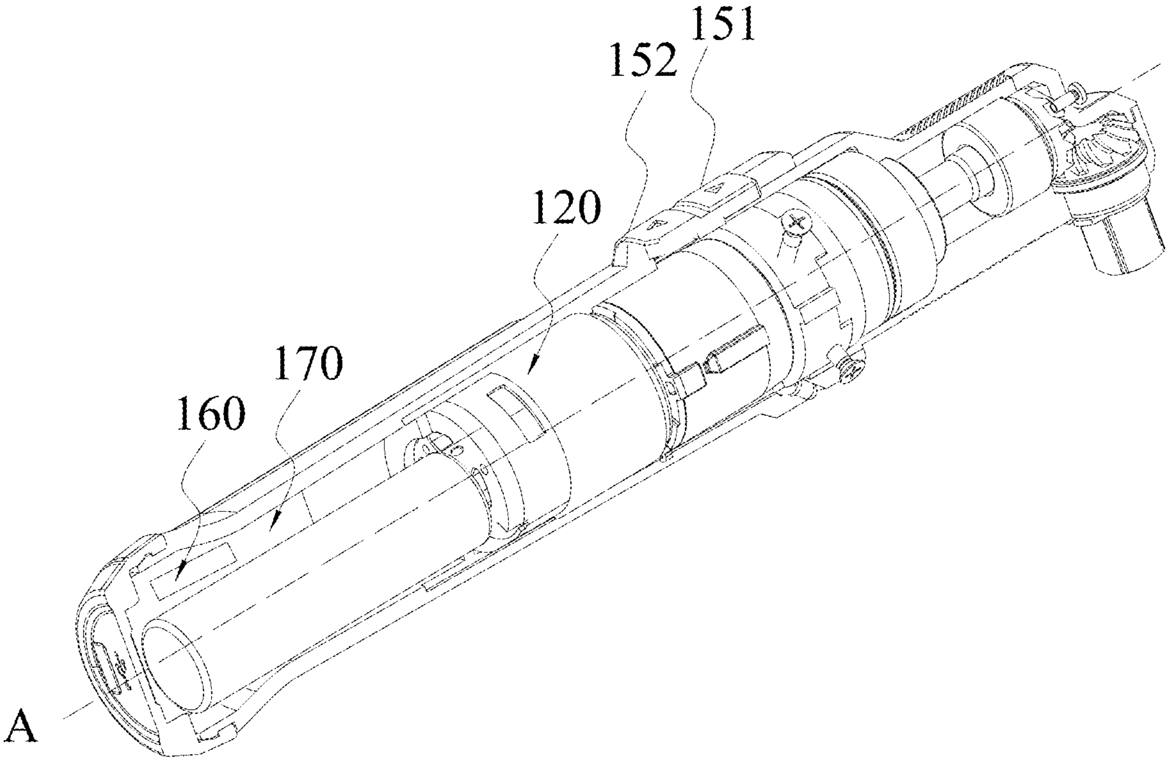
FIG. 14 is a perspective view of an electric wrench including a switch assembly according to an example.

As shown in FIG. 14, the electric wrench 100 further includes a controller 160 for controlling the rotation of the electric motor 120. The controller 160 is disposed on a circuit board 170 of the electric wrench 100, is connected to the battery 140, the electric motor 120, and the switch assembly 150, and controls the rotation of the electric motor 120 based on signals from the battery 140 and the switch assembly 150. In addition, the controller 160 may be disposed at any position inside the electric wrench 100 such that the controller 160 is connected to the battery 140, the electric motor 120, and the switch assembly 150 and can control the electric motor 120.

The switch assembly 150 includes a forward rotation switch 151 and a reverse rotation switch 152. The forward rotation switch 151 and the reverse rotation switch 152 may be arranged along the first axis A as shown in FIG. 14, along a direction perpendicular to the first axis A, or the along a direction intersecting with the first axis A at any angle. The first direction corresponds to the forward rotation direction, and the second direction corresponds to the reverse rotation direction. The case where the first direction is the clockwise direction and the second direction is the counterclockwise direction is used as an example for a specific description of the present application. In addition, the first direction may be the counterclockwise direction, and the second direction may be the clockwise direction. After the user presses the forward rotation switch 151, the controller 160 controls the electric motor 120 to continuously rotate along the clockwise direction to tighten the fastener until the fastener is completely tightened. After the user presses the reverse rotation switch 152, the controller 160 controls the electric motor 120 to continuously rotate along the counterclockwise direction to loosen the fastener until the fastener is completely loosened. Therefore, when the electric wrench 100 is in the electric working mode, the user only needs to press the forward rotation switch 151 or the reverse rotation switch 152 to control the electric wrench 100 to tighten or loosen the fastener.

In some examples, when the power of the electric wrench 100 is insufficient, the user needs to manually operate the electric wrench 100, that is, the electric wrench 100 enters the manual working mode. However, in the electric working mode, the forward rotation switch 151 is already pressed to make the electric wrench 100 tighten the fastener in the first direction (the clockwise direction), or the reverse rotation switch 152 is pressed to make the electric wrench 100 loosen the fastener in the second direction (the counterclockwise direction). If the electric wrench 100 in this state is directly operated, the electric wrench 100 can perform only a tightening operation or a loosening operation. In this case, the electric wrench 100 needs to retain a certain amount of power to control the electric motor 120.

When the battery level of the battery 140 is lower than a preset threshold, the controller 160 controls the drive shaft 121 of the electric motor 120 to stop rotating. The preset threshold is the battery level of the battery 140 that is sufficient to control the electric motor 120 to rotate slightly. Optionally, when the battery 140 has a nominal voltage of 4 V, the preset threshold may be 3.5 V. After the battery level is lower than the preset threshold and the forward rotation switch 151 or the reverse rotation switch 152 is triggered, the controller 160 controls the electric motor 120 to drive the electric wrench 100 to enter the manual working mode. The case where the electric motor 120 drives the electric wrench 100 to enter the manual working mode is specifically that the electric motor 120 rotates by a smaller angle.

Optionally, when the electric wrench 100 is in the electric working mode, the fastener is rotated in the first direction (the clockwise direction) and tightened, that is, when the forward rotation switch 151 is pressed in the electric working mode, if the fastener still needs to be tightened in the first direction (the clockwise direction), the user does not need to press any switch when switching the electric wrench 100 to the manual working mode and can directly continue using the electric wrench 100. If the fastener needs to be loosened along the second direction (the counterclockwise direction), the manual forward and manual return directions in this case are opposite to the previous ones, the user needs to press the reverse rotation switch 152 to drive the drive shaft 121 of the electric motor 120 to rotate by a certain angle so that the internal structure of the clutch assembly 200 corresponds to the counterclockwise direction, which is the forward direction. The specific relationship of the clutch assembly 200 between the manual return stroke and the manual forward stroke has been specifically described above in the present application, and the details are not repeated here.

Optionally, when the electric wrench 100 is in the electric working mode, the fastener is rotated in the second direction (the counterclockwise direction) and loosened, that is, when the reverse rotation switch 152 is pressed in the electric working mode, if the fastener still needs to be loosened in the second direction (the counterclockwise direction), the user does not need to press any switch when switching the electric wrench 100 to the manual working mode and can directly continue using the electric wrench 100. If the fastener needs to be rotated and tightened along the first direction (the clockwise direction), the manual forward and manual return directions in this case are opposite to the previous ones, the user needs to press the forward rotation switch 151 to drive the drive shaft 121 of the electric motor 120 to rotate by a certain angle so that the internal structure of the clutch assembly 200 corresponds to the clockwise direction, which is the forward direction.

Therefore, when the electric wrench 100 switches from the electric working mode to the manual working mode, if the forward stroke and return stroke of the manual working mode are the same as the previous ones, no switch needs to be pressed; if the forward stroke and return stroke of the manual working mode are opposite to the previous ones, a different switch from the previous one needs to be pressed to change the forward and return directions.

Figure 15:
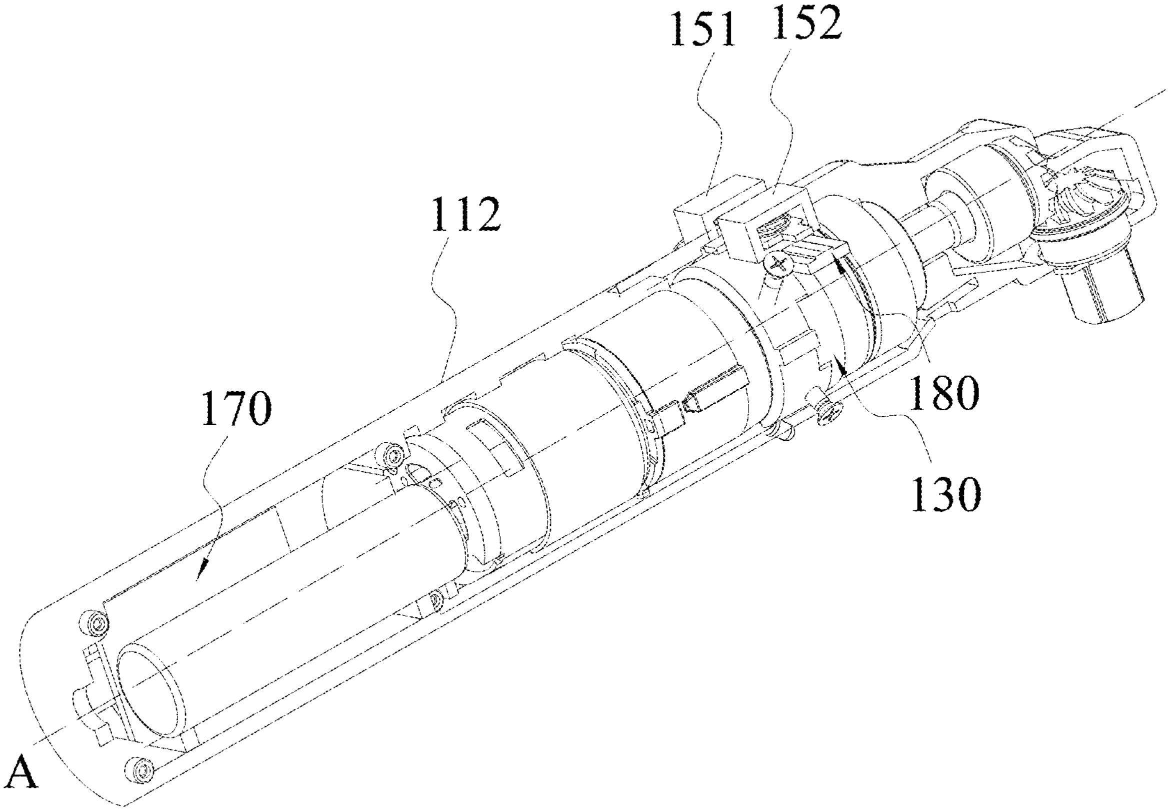
FIG. 15 is a perspective view of an electric wrench including a switch assembly and a reversing member according to an example.

In some examples, as shown in FIG. 15, the electric wrench 100 includes a reversing member 180 disposed on the grip 102 of the electric wrench 100 and in contact with the first shaft locking assembly 210. The reversing member 180 can enable the electric wrench 100 to normally enter the manual working mode when the battery 140 of the electric wrench 100 is completely out of power and cannot drive the electric motor 120 to rotate.

Figure 16:
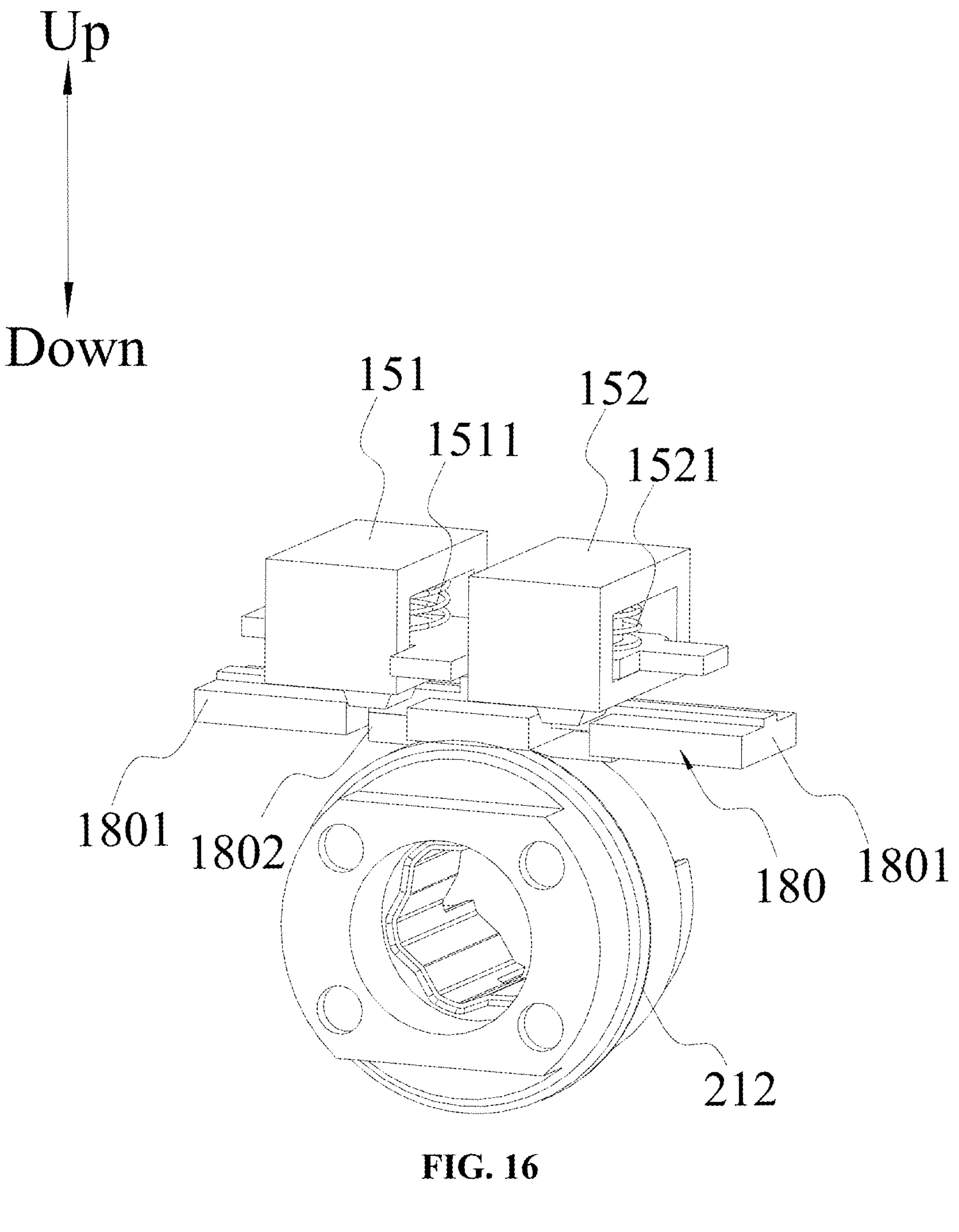
FIG. 16 is a perspective view of the reversing member in FIG. 15.

As shown in FIG. 16, the forward rotation switch 151 and the reverse rotation switch 152 are both disposed on the upper side of the reversing member 180, and both the forward rotation switch 151 and the reverse rotation switch 152 protrude from the grip housing 112. The reversing member 180 may be disposed at any position on the grip 102 for convenient operation by the user. No matter where the reversing member 180 is located, the forward rotation switch 151 and the reverse rotation switch 152 are both disposed on the upper side of the reversing member 180. Optionally, the forward rotation switch 151 and the reverse rotation switch 152 may be arranged along a direction perpendicular to the first axis A as shown in FIG. 15. Optionally, the line between the forward rotation switch 151 and the reverse rotation switch 152 may intersect with the first axis A at any angle, which is not limited in the present application.

The reversing member 180 includes a first opening 181 and a second opening 182. When the reversing member 180 is at a first position, the first opening 181 corresponds to the forward rotation switch 151, and the second opening 182 corresponds to the reverse rotation switch 152. The reversing member 180 is at the first position when the battery 140 is fully charged. A forward rotation switch spring 1511 is disposed inside the forward rotation switch 151, and a reverse rotation switch spring 1521 is disposed inside the reverse rotation switch 152. When the battery 140 is fully charged, that is, the reversing member 180 is at the first position, the forward rotation switch 151 can be pressed to be activated and penetrate the first opening 181 based on the forward rotation switch spring 1511 so that the controller 160 controls the drive shaft 121 of the electric motor 120 to rotate along the first direction. Alternatively, the reverse rotation switch 152 can be pressed to be activated and penetrate the second opening 182 based on the reverse rotation switch spring 1521 so that the controller 160 controls the drive shaft 121 of the electric motor 120 to rotate along the second direction. In addition, the forward rotation switch 151 can be reset by pressing the forward rotation switch spring 1511, and the controller 160 controls the electric motor 120 to stop rotating; and the reverse rotation switch 152 can be reset by pressing the reverse rotation switch spring 1521, and the controller 160 controls the electric motor 120 to stop rotating.

Figure 17:
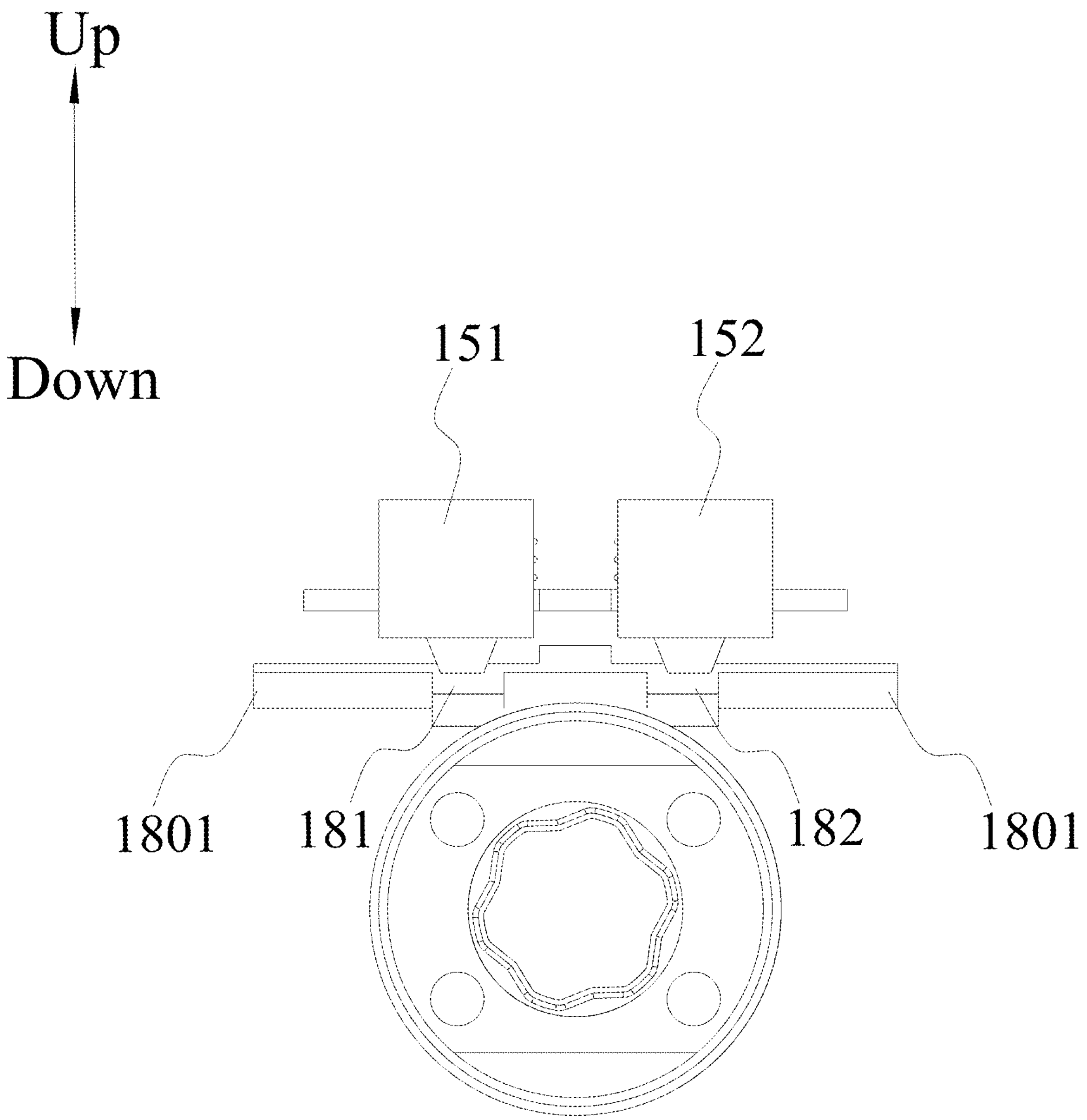
FIG. 17 is a front view of the reversing member in FIG. 15.

As shown in FIGS. 16 and 17, the reversing member 180 includes a portion disposed inside the grip housing 112 and protruding portions 1801 protruding from the grip housing 112 for manual operation by the user. When the battery 140 of the electric wrench 100 is completely out of power, the user pushes the protruding portions 1801 so that the reversing member 180 is pushed to a second position. In this case, the first opening 181 no longer corresponds to the forward rotation switch 151, the second opening 182 no longer corresponds to the reverse rotation switch 152, and the reversing member 180 prevents the forward rotation switch 151 or the reverse rotation switch 152 from being pressed and activated.

The reversing member 180 is in contact with the reversing wheel 212. When the reversing member 180 is pushed from the first position to the second position, the reversing member 180 drives the reversing wheel 212 to rotate so that the locking posts 213 are not in contact with the transmission shaft 240 to perform a manual return stroke, or the locking posts 213 are in contact with the transmission shaft 240 to perform a manual forward stroke. Therefore, through the first shaft locking assembly 210, the reversing member 180 enables the electric wrench 100 to enter the manual working mode even when the electric wrench 100 is completely out of power. The specific relationship of the clutch assembly 200 between the manual return stroke and the manual forward stroke has been specifically described above in the present application, and the details are not repeated here. When the battery 140 of the electric wrench 100 has power, the user pushes the protruding portions 1801 again so that the reversing member 180 is pushed to the first position from the second position.

In addition, as shown in FIG. 16, a switch friction member 1802 is disposed between the reversing member 180 and the first shaft locking assembly 210 to increase the friction between the reversing member 180 and the reversing wheel 212 so that the reversing member 180 can stably drive the reversing wheel 212 to rotate. Optionally, the switch friction member 1802 may be rubber. Optionally, the switch friction member 1802 may be any component having friction, which is not limited in the present application.

Therefore, when the electric wrench 100 completely out of power is in the manual working mode, the user controls the electric wrench 100 to tighten or loosen the fastener through the forward rotation switch 151, the reverse rotation switch 152, and the reversing member 180.

Figure 18:
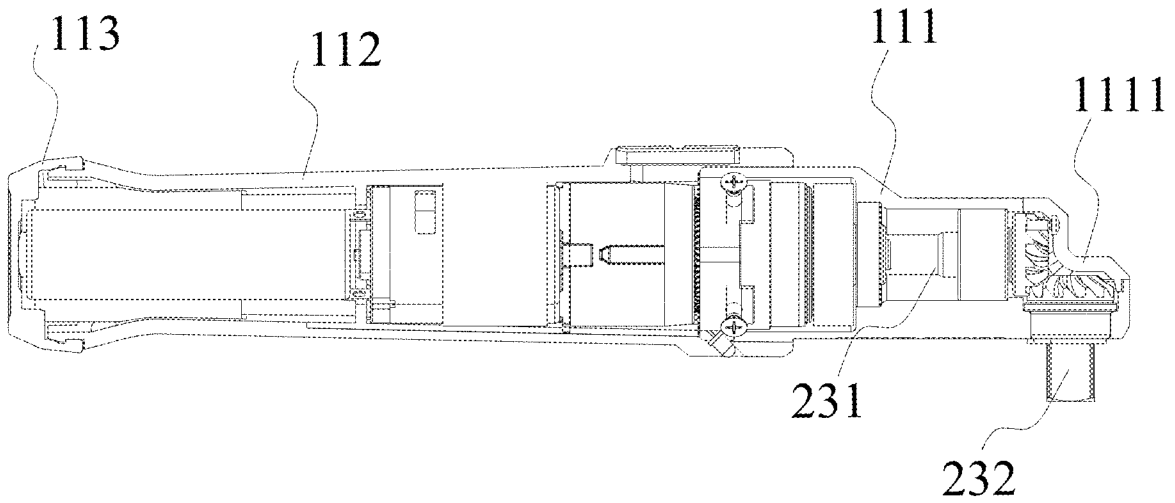
FIG. 18 is a side view of a housing according to an example.

In some examples, as shown in FIG. 18, the housing 110 is formed by the head housing 111, the grip housing 112, and the rear cover 113. In this case, the grip housing 112 and the rear cover 113 are formed separately, and the rear cover 113 is detachably mounted to the grip housing 112. Optionally, the grip housing 112 is plastic. Optionally, the head housing 111 is at least partially a metal housing so that the head housing 111 has higher strength and better ductility. The head housing 111 can extend to the portion covered by the grip housing 112 to accommodate one or more of the clutch assembly 200, the transmission assembly 130, the electric motor 120, and the battery 140 in sequence, thereby enhancing the overall strength of the electric wrench 100. As shown in FIG. 18, the head housing 111 includes a front housing 1111, and the front housing 1111 specifically refers to a portion corresponding to the meshing connection between the first output shaft 231 and the second output shaft 232. Optionally, the front housing 1111 is a metal housing. Optionally, the front housing 1111 is a transparent plastic housing so that the user can observe the meshing transmission between the first output shaft 231 and the second output shaft 232 conveniently.

In some examples, the housing 110 is fixedly mounted by screws and nuts. The rear cover 113 is mounted to the grip housing 112 by screws; in the radial direction of the electric wrench 100, the screws pass through the grip housing 112 and the head housing 111 to fix the grip housing 112 and the head housing 111; and the front housing 1111 is mounted to the head housing 111 via screws. In some examples, the housing 110 is fixedly mounted without screws and nuts. The rear cover 113 is mounted to the grip housing 112 through snap fitting or threaded tightening. The grip housing 112 is an integrated tubular housing. The grip housing 112 and the head housing 111 are connected and mounted through threaded tightening. The front housing 1111 is mounted to the head housing 111 through snap fitting.

In some examples, when the housing 110 is formed by the head housing 111, the grip housing 112, and the rear cover 113, the entire housing 110 is a sealed housing, and the housing 110 does not include a channel connecting with the outside. Therefore, the entire electric wrench 100 has good waterproof and dustproof capabilities and can be used for underwater operations. Optionally, the head housing 111 made of metal material is in contact with a metal part such as the electric motor 120 or the transmission assembly 130, and the head housing 111 made of metal material can dissipate heat to the outside so that the heat generated by the metal part such as the electric motor 120 or the transmission assembly 130 can be transferred to the outside through the head housing 111, thereby dissipating heat for the electric wrench 100. Optionally, a heat absorbing material is disposed near a heat source inside the housing 110, such as the electric motor 120 or other parts, thereby dissipating heat for the electric wrench 100.

Figure 19:
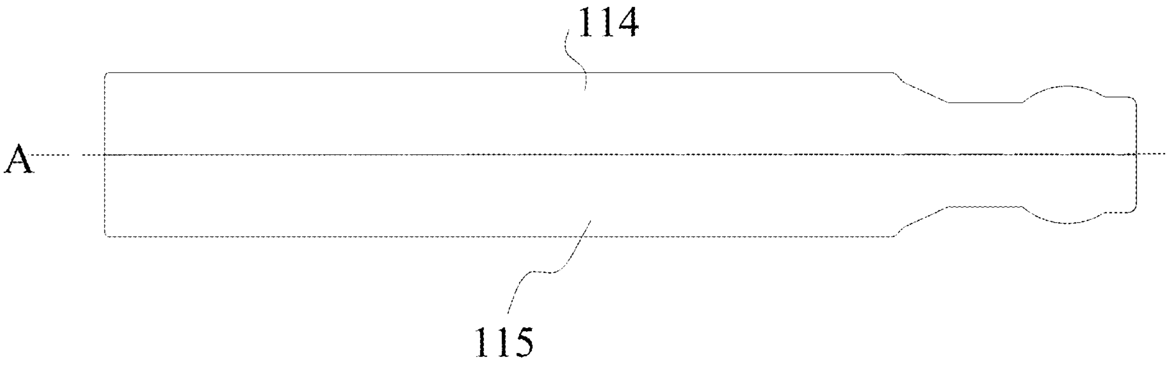
FIG. 19 is a top view of a housing according to an example.

In some examples, as shown in FIG. 19, the housing 110 includes a first housing 114 and a second housing 115, and the first housing 114 and the second housing 115 are two housings parallel to a vertical plane where the first axis A is located. Each of the first housing 114 and the second housing 115 is a half housing of the entire housing 110. The first housing 114 and the second housing 115 are symmetrical about the vertical plane where the first axis A is located, and the housing 110 is formed by fixedly connecting the first housing 114 to the second housing 115. Optionally, the first housing 114 and the second housing 115 are plastic. Optionally, when the entire housing 110 is plastic, to enhance the stability of the meshing connection between the first output shaft 231 and the second output shaft 232, a metal connecting frame is disposed on the first output shaft 231 and the second output shaft 232, the first output shaft 231 and the second output shaft 232 both pass through the metal connecting frame, and the metal connecting frame is fixed to the housing 110 by screws.

In some examples, when the housing 110 is formed by the head housing 111, the grip housing 112, and the rear cover 113 or the housing 110 is formed by the first housing 114 and the second housing 115, a channel connecting with the outside is provided on the housing 110 to dissipate heat for the electric wrench 100.

In some examples, as shown in FIG. 2, the transmission assembly 130 includes an inner ring gear 131, and the inner ring gear 131 is in direct contact with the housing 110, that is, the transmission assembly 130 does not include a gearbox. As shown in FIG. 15, the circuit board 170 is used for controlling the operation of the electric wrench 100, and the circuit board 170 is parallel to the vertical plane where the first axis A is located. The sides of the circuit board 170 parallel to the first axis A are the longer sides, and the sides of the circuit board 170 perpendicular to the first axis A are the shorter sides. The battery 140 is inserted into the housing 110 along a direction parallel to the first axis A. The side of the battery 140 parallel to the first axis A is the longer side, and the side of the battery 140 perpendicular to the first axis A is the shorter side. The electric wrench 100 has a smaller width due to the structure of the transmission assembly 130 and the arrangement of the circuit board 170 and the battery 140. In addition, the battery 140 may be a detachable battery disposed outside the housing 110, and the housing 110 is provided with an interface mating with the battery 140 so that the battery 140 that has insufficient power can be replaced in time.

Figure 20:
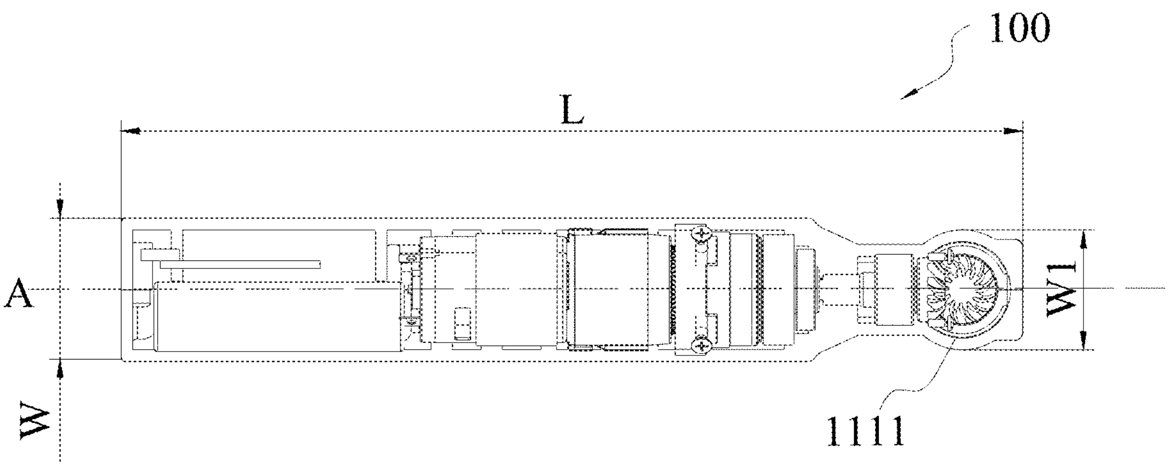
FIG. 20 is a top view illustrating the inside of the electric wrench in FIG. 1.

In some examples, as shown in FIG. 20, in a direction perpendicular to the first axis A, the width W of the electric wrench 100 is less than or equal to 50 mm. Optionally, the width W of the electric wrench 100 is 45 mm. Optionally, the width W of the electric wrench 100 is 40 mm. Optionally, the width W of the electric wrench 100 is 35 mm. Optionally, the width W of the electric wrench 100 is 30 mm. In some examples, in a direction parallel to the first axis A, the length L of the electric wrench 100 is less than or equal to 300 mm. Optionally, the length L of the electric wrench 100 is 285 mm. Optionally, the length L of the electric wrench 100 is 250 mm. Optionally, the length L of the electric wrench 100 is 230 mm. Optionally, the length L of the electric wrench 100 is 215 mm. Optionally, the length L of the electric wrench 100 is 214.2 mm.

In some examples, different parts of the electric wrench 100 have different widths. Optionally, the width of the grip 102 is 38 mm. Optionally, the width of the grip 102 is 36 mm. Optionally, the width of the grip 102 is 32 mm. Optionally, when the grip 102 is substantially in the shape of an elliptical tube, the width of the grip 102 is 38 mm in a top view as shown in FIG. 20, and the width of the grip 102 is 36 mm in a side view as shown in FIG. 18. In some examples, in a top view as shown in FIG. 20, the width W1 of the frontmost end of the head 101 is less than or equal to 35 mm, that is, the width of a portion corresponding to the front housing 1111 is less than or equal to 35 mm. Optionally, the width of the portion corresponding to the front housing 1111 is 33 mm. Optionally, the width of the portion corresponding to the front housing 1111 is 30 mm. Optionally, the width of the portion corresponding to the front housing 1111 is 28 mm. Optionally, the width of the portion corresponding to the front housing 1111 is 25 mm. Optionally, the width of the portion corresponding to the front housing 1111 is 24.8 mm.

Figure 21:
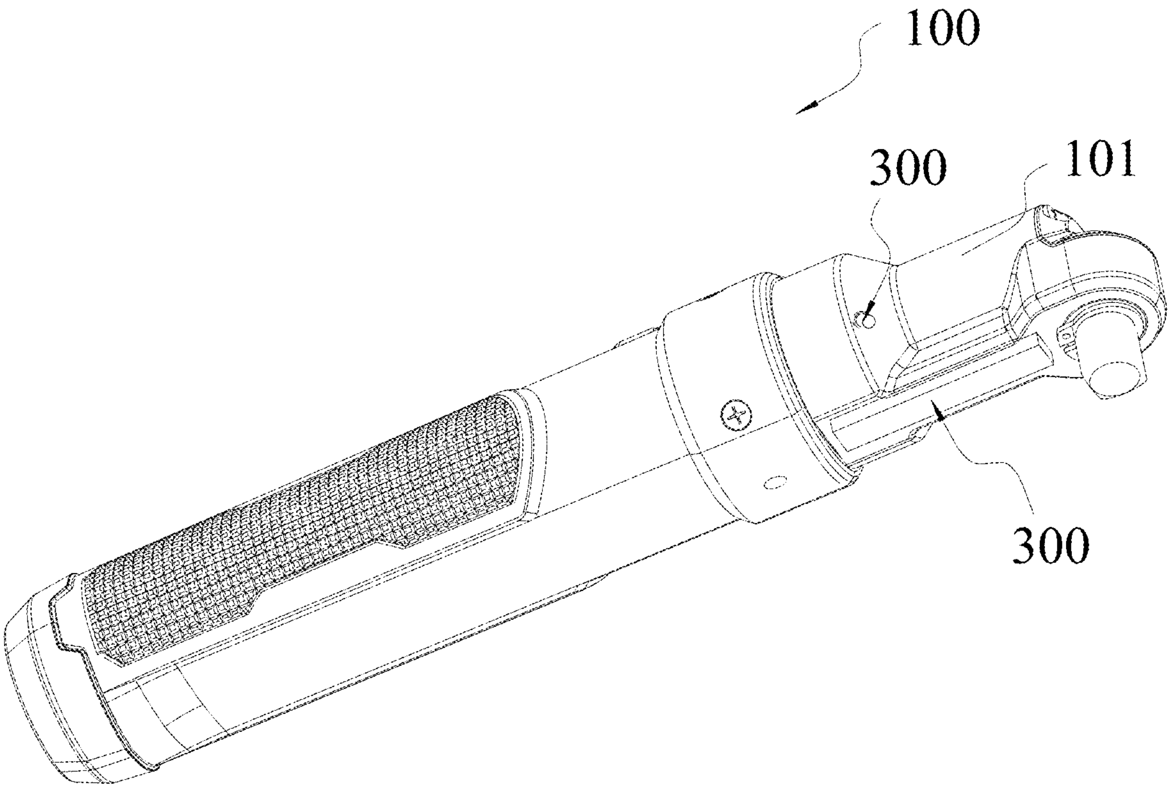
FIG. 21 is a perspective view of an electric wrench including an illumination assembly according to an example.

In some examples, the electric wrench 100 further includes an illumination assembly 300 disposed on the head 101 of the electric wrench 100. The illumination assembly 300 may be disposed on any part of the head 101 where clear illumination can be achieved. Optionally, the illumination assembly 300 may be a single light. Optionally, the illumination assembly 300 may be multiple lights disposed on the head 101. Optionally, the illumination assembly 300 may be a ring light around the head 101. Optionally, the illumination assembly 300 may be a light strip. Optionally, the illumination assembly 300 may include lights in various forms. For example, as shown in FIG. 21, the illumination assembly 300 includes both a single light and a light strip. In addition, the illumination assembly 300 may also be lights of other forms, which is not limited in the present application.

The switch assembly 150 is connected to the circuit board 170, and the illumination assembly 300 is also connected to the circuit board 170. To reduce the number of connecting wires and reduce the radial dimension of the electric wrench 100, the illumination assembly 300 is directly connected to the circuit board 170 along a direction parallel to the first axis A, and the connecting wire between the switch assembly 150 and the circuit board 170 includes at least a portion intersecting with the first axis A. Optionally, the angle at which the connecting wire between the switch assembly 150 and the circuit board 170 intersects with the first axis A is not limited in the present application, and the connecting wire between the switch assembly 150 and the circuit board 170 may include at least a portion perpendicular to the first axis A.

Figure 22:
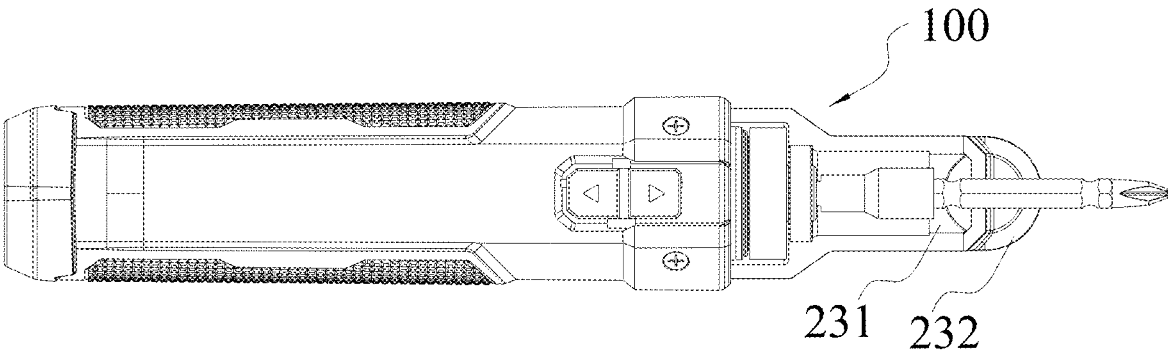
FIG. 22 is a top view of an electric wrench without a front housing according to an example.
Figure 23:
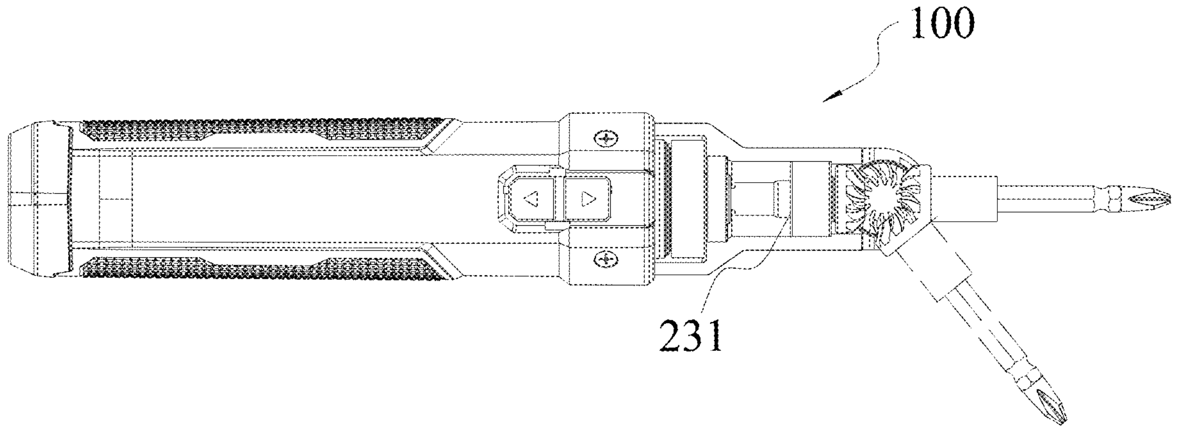
FIG. 23 is a top view of an electric wrench including only a first output shaft according to an example.

In some examples, as shown in FIG. 22, no corresponding front housing 1111 is provided for the first output shaft 231 and the second output shaft 232, and an internal hexagonal hole is provided on the first output shaft 231 so that the screwdrivers can be inserted into the first output shaft 231 and the second output shaft 232 at the same time, or the screwdriver can be inserted into any one of the first output shaft 231 and the second output shaft 232. In some examples, as shown in FIG. 23, the output shaft 230 includes only the first output shaft 231, which is a rotatable output shaft. In this manner, after the screwdriver is inserted into the first output shaft 231, multi-angle operation can be achieved by rotating the first output shaft 231 left and right.

The basic principles, main features, and advantages of this application are shown and described above. It is to be understood by those skilled in the art that the aforementioned examples do not limit the present application in any form, and all technical solutions obtained through equivalent substitutions or equivalent transformations fall within the scope of the present application.

What is claimed is:

1. A power tool, comprising:
- a housing formed with or connected to a grip for holding;
- a motor comprising a drive shaft rotating about a first axis;
- a clutch assembly driven by the drive shaft; and
- a transmission assembly connecting the motor to the clutch assembly;
- wherein the clutch assembly comprises a first shaft locking assembly, a second shaft locking assembly, a transmission shaft, and an output shaft, the output shaft comprises a first output shaft, the first shaft locking assembly is sleeved on the transmission shaft and the first output shaft and is used for transmitting torque of the transmission shaft to the output shaft, the second shaft locking assembly connects the transmission assembly to the first shaft locking assembly and is used for transmitting torque of the transmission assembly to the first shaft locking assembly, when the drive shaft remains stationary and the first output shaft rotates along a first direction, the first shaft locking assembly prevents the transmission shaft from rotating and the transmission shaft remains stationary, and, when the drive shaft remains stationary and the first output shaft rotates along a second direction, the first shaft locking assembly drives the transmission shaft to rotate along the second direction opposite to the first direction and the second shaft locking assembly prevents the transmission shaft and the first output shaft from rotating.

2. The power tool of claim 1, wherein the output shaft further comprises a second output shaft, the first output shaft rotates about the first axis, the second output shaft rotates about a second axis, and the first axis intersects with the second axis.

3. The power tool of claim 1, wherein the first shaft locking assembly comprises a first shaft locking ring and a reversing wheel, a first end of the first shaft locking ring is sleeved on the first output shaft, a second end of the first shaft locking ring mates with the reversing wheel, and the reversing wheel is sleeved on the transmission shaft.

4. The power tool of claim 3, wherein the first shaft locking assembly further comprises a friction member and an abutment member, a side of the friction member is in contact with the reversing wheel, and another side of the friction member is in contact with the abutment member.

5. The power tool of claim 4, wherein, when the first output shaft rotates along the first direction, the first output shaft drives the first shaft locking ring to rotate, the friction member prevents the first shaft locking ring from driving the reversing wheel to rotate, and the reversing wheel remains stationary to prevent the transmission shaft from rotating.

6. The power tool of claim 3, wherein a protrusion is formed on a surface of the reversing wheel facing away from the first shaft locking ring, the first shaft locking assembly further comprises a stopping assembly sleeved on an outer ring of the protrusion, and, when the output shaft rotates along the first direction, the stopping assembly prevents the first shaft locking ring from driving the reversing wheel to rotate.

7. The power tool of claim 6, wherein the protrusion is a gear-like protrusion, the stopping assembly comprises stop balls, a sleeve, elastic members, and a limiting ring, the sleeve comprises holes, each of the stop balls passes through a respective one of the holes and abuts against the protrusion, each of the elastic members passes through the respective one of the holes and abuts against a respective one of the stop balls, and the limiting ring is sleeved on an outer ring of the sleeve and abuts against the elastic members.

8. The power tool of claim 6, wherein the stopping assembly comprises a stop ring, the stop ring comprises a plurality of stopping portions protruding inward of the stop ring, and the plurality of stopping portions abut against the protrusion.

9. The power tool of claim 8, wherein the protrusion is a smooth annular protrusion, and the plurality of stopping portions are made of flexible rubber materials.

10. The power tool of claim 3, wherein an accommodation space is formed at a portion where the first shaft locking ring is in contact with the reversing wheel, and the transmission shaft comprises a portion located in the accommodation space.

11. The power tool of claim 10, wherein the first shaft locking assembly further comprises a plurality of locking posts and a plurality of toggle blocks, the plurality of toggle blocks are fixedly connected to the reversing wheel, the plurality of locking posts and the plurality of toggle blocks are disposed in the accommodation space and surround the transmission shaft, and the plurality of locking posts are spaced apart from the plurality of toggle blocks.

12. The power tool of claim 11, wherein, when the first output shaft rotates along the first direction, the plurality of locking posts rotate along the first direction, and the accommodation space where the plurality of locking posts are located increases so that the plurality of locking posts are not in contact with the transmission shaft.

13. The power tool of claim 11, wherein the second shaft locking assembly comprises a second shaft locking ring fixedly disposed in the housing.

14. The power tool of claim 13, wherein, when the drive shaft remains stationary and the first output shaft rotates along the second direction, the plurality of locking posts rotate along the second direction, and the accommodation space where the plurality of locking posts are located decreases so that the plurality of locking posts are in contact with the transmission shaft and the first shaft locking ring, and the transmission shaft is driven to rotate along the second direction.

15. The power tool of claim 14, wherein, when the transmission shaft rotates along the second direction, the second shaft locking assembly prevents the transmission shaft from continuously rotating.

16. A power tool, comprising:
- a housing formed with or connected to a grip for holding;
- a motor comprising a drive shaft rotating about a first axis;
- a clutch assembly driven by the drive shaft; and
- a transmission assembly connecting the motor to the clutch assembly;
- wherein the clutch assembly comprises a first shaft locking assembly, a second shaft locking assembly, a transmission shaft, and an output shaft, the output shaft comprises a first output shaft, the second shaft locking assembly connects the transmission assembly to the first shaft locking assembly, the first shaft locking assembly is sleeved on the transmission shaft and the first output shaft, when the drive shaft remains stationary and the first output shaft and the transmission shaft are in a separated state, the first output shaft rotates relative to the transmission shaft along a first direction, when the drive shaft remains stationary and the first output shaft and the transmission shaft are in an engaging state, the first output shaft and the transmission shaft rotate along a second direction opposite to the first direction synchronously, and the second shaft locking assembly prevents the transmission shaft and the first output shaft from rotating.

17. A power tool, comprising:

a housing formed with or connected to a grip for holding;

a motor comprising a drive shaft rotating about a first axis;

a clutch assembly driven by the drive shaft; and a transmission assembly connecting the motor to the clutch assembly;

wherein the clutch assembly comprises a first shaft locking assembly, a second shaft locking assembly, a transmission shaft, and an output shaft, the second shaft locking assembly connects the transmission assembly to the first shaft locking assembly, the first shaft locking assembly is sleeved on the transmission shaft and the output shaft, the output shaft comprises a first output shaft and a second output shaft, the first shaft locking assembly is sleeved on the transmission shaft and the first output shaft and is used for transmitting torque of the transmission shaft to the first output shaft, the first output shaft transmits the torque to the second output shaft, and, when the drive shaft remains stationary and the output shaft and the transmission shaft are in a separated state, the first output shaft rotates relative to the second output shaft along a first direction.

18. The power tool of claim 17, wherein the first output shaft rotates about the first axis, the second output shaft rotates about a second axis, and the first axis intersects with the second axis.

19. The power tool of claim 17, wherein, when the drive shaft remains stationary and the output shaft and the transmission shaft are in an engaging state, the first output shaft drives the second output shaft to rotate along the first direction.

20. The power tool of claim 17, wherein the second output shaft comprises a clamping portion for clamping working attachments for implementing different functions.

* * * * *